(12) United States Patent
Avett et al.

(10) Patent No.: US 8,640,290 B1
(45) Date of Patent: Feb. 4, 2014

(54) ADJUSTABLE BREAST SUPPORT APPARATUS

(76) Inventors: Randall D. Avett, St. Louis, MO (US); Sarah E. Deweese, Florissant, MO (US)

( * ) Notice: Subject to any disclaimer, the term of this patent is extended or adjusted under 35 U.S.C. 154(b) by 0 days.

(21) Appl. No.: 13/189,382

(22) Filed: Jul. 22, 2011

Related U.S. Application Data

(60) Provisional application No. 61/367,241, filed on Jul. 23, 2010.

(51) Int. Cl.
*B68G 5/00* (2006.01)

(52) U.S. Cl.
USPC .................................................. 5/657; 5/652

(58) Field of Classification Search
USPC ............ 5/631, 632, 635, 639, 640, 643, 646, 5/647, 657; 248/168; 297/423.45
See application file for complete search history.

(56) References Cited

U.S. PATENT DOCUMENTS

| | | | | |
|---|---|---|---|---|
| 2,630,288 A * | 3/1953 | Eubanks, Sr. | | 248/118 |
| 3,390,477 A * | 7/1968 | Galbraith | | 42/94 |
| 4,949,944 A * | 8/1990 | Groff, Sr. | | 269/45 |
| 5,353,809 A * | 10/1994 | Faucher | | 5/646 |
| 5,462,518 A * | 10/1995 | Hatley et al. | | 602/36 |
| 5,926,882 A * | 7/1999 | Veith et al. | | 5/658 |
| 6,237,821 B1 * | 5/2001 | Owen | | 224/200 |
| 6,708,935 B2 * | 3/2004 | Smeed | | 248/118 |
| 6,874,184 B2 * | 4/2005 | Chandler | | 5/648 |
| 7,337,483 B2 * | 3/2008 | Boucher et al. | | 5/621 |
| 7,669,934 B1 * | 3/2010 | Cline | | 297/423.45 |
| 7,934,687 B2 * | 5/2011 | Crook et al. | | 248/168 |
| 2008/0172791 A1 * | 7/2008 | Walczyk | | 5/623 |

* cited by examiner

*Primary Examiner* — William Kelleher
*Assistant Examiner* — Richard G Davis
(74) *Attorney, Agent, or Firm* — Kevin L. Klug

(57) ABSTRACT

An adjustable breast support apparatus and method of use having a base, an upright support, and one or more breast supporter assemblies having breast supports for supporting the breasts and easing the weight and strain placed upon a user's back and torso. The base rests or attaches with a table, a chair, or another structure or the base may be mounted with the user's belt. The breast supports are shaped to comfortably conform to the underside of the users breasts. A retaining strap holder and retaining strap allow for a third point of support whereby the apparatus is further secured with the user.

1 Claim, 32 Drawing Sheets

ADJUSTABLE BREAST SUPPORT APPARATUS

This application claims priority of U.S. Provisional Patent Application No. 61/367,241 filed Jul. 23, 2010, entitled Adjustable Breast Support Apparatus.

BACKGROUND OF THE INVENTION

The art of the present invention relates to breast support devices in general and more particularly to an apparatus and a method of use which is capable of supporting a person's breasts while positioned upon said person's lap, a nearby table, a belt, or another structure such as a chair. The apparatus and method is especially usable by persons having larger or heavier breasts who further desire to provide relief to the back and upper body from the weight of said breasts.

It is well understood within the biological arts that some women (and even some men) are genetically disposed to have larger and/or heavier breasts. Unfortunately, the weight of said breasts must be supported by the upper body and back. This places an undesirable strain upon the back, the spine, and the upper torso when sitting or standing. Even if a woman has a properly sized and shaped brassiere, the upper body and back must support the aforesaid weight when seated or standing.

The present art provides an upright support having a yoke and a breast supporter assembly which seats or fits under one or more of a person's breasts and provides support. The support provided minimizes the stress and weight placed upon the person's back and upper torso. The present art quickly and easily secures with or seats with a table, the user's belt, a tabletop, a chair, or another structure in order to provide the aforesaid relief. A retaining strap and holder is utilized when further support of the upright support is desired.

Accordingly, it is an object of the present invention to provide an adjustable breast support apparatus and method of use having an upright support which is quickly and easily attachable with a base or other retaining structure and further comfortably supports one or more breasts of a user.

Another object of the present invention is to provide an adjustable breast support apparatus which is able to remove or limit a user's upper back and torso weight bearing requirements due to the excess weight of larger breasts.

A further object of the present invention is to provide an adjustable breast support apparatus which is capable of use relative to a plurality of fixtures which include tabletops, tables, laps, and belts and which is fully adjustable relative thereto.

SUMMARY OF THE INVENTION

In all embodiments, the art of the present invention represents an apparatus having an upright support which attaches with a yoke and/or a breast supporter assembly and which is held by a base which is mountable or attachable with a plurality of fixed points including but not limited to tables, chairs, laps, belts, or other fixtures. Each breast supporter assembly has a breast supporter with top surface which sits beneath the user's breast(s) and provides support therefor. A "U" shaped or concave surface may be provided on the top surface in order to better seat with the user's breast. A "D" surface shape may further provide the proper outline of the user's breast.

Each embodiment of the present art apparatus has a base or an arm which retains and supports the upright support. The base is capable of sitting on a tabletop or lap and provides a foundation for the apparatus. The arm is capable of clamping upon a tabletop, a table, a chair or another structure and secure the upright support during use. A slight variant of the base or arm allows a user to thread the user's belt through a belt channel of the arm and utilize the retention capabilities of the user's belt to hold the apparatus.

For all embodiments, a retaining strap holder and retaining strap allows a user to further secure the apparatus by placing the retaining strap around a user's torso. The retaining strap holder secures with the upright support and provides a third point of retention for the apparatus.

As described, the art of the present invention may be manufactured from a plurality of materials including but not limited to metals and alloys thereof, plastics, woods, composites, or ceramics without departing from the scope and spirit herein intended. The apparatus may further be manufactured via molding, machining, casting, forging, pressing, laminating, carving, extruding, fastening, or utilization of stereolithographic or other techniques which are appropriate for the material utilized. For all of the embodiments described herein, the apparatus is preferably manufactured from a polymer material having a reasonably high value of thermal resistance.

BRIEF DESCRIPTION OF THE DRAWINGS

Numerous other objects, features, and advantages of the invention should now become apparent upon a reading of the following detailed description taken in conjunction with the accompanying drawings, in which.

DETAILED DESCRIPTION

Figure 1:
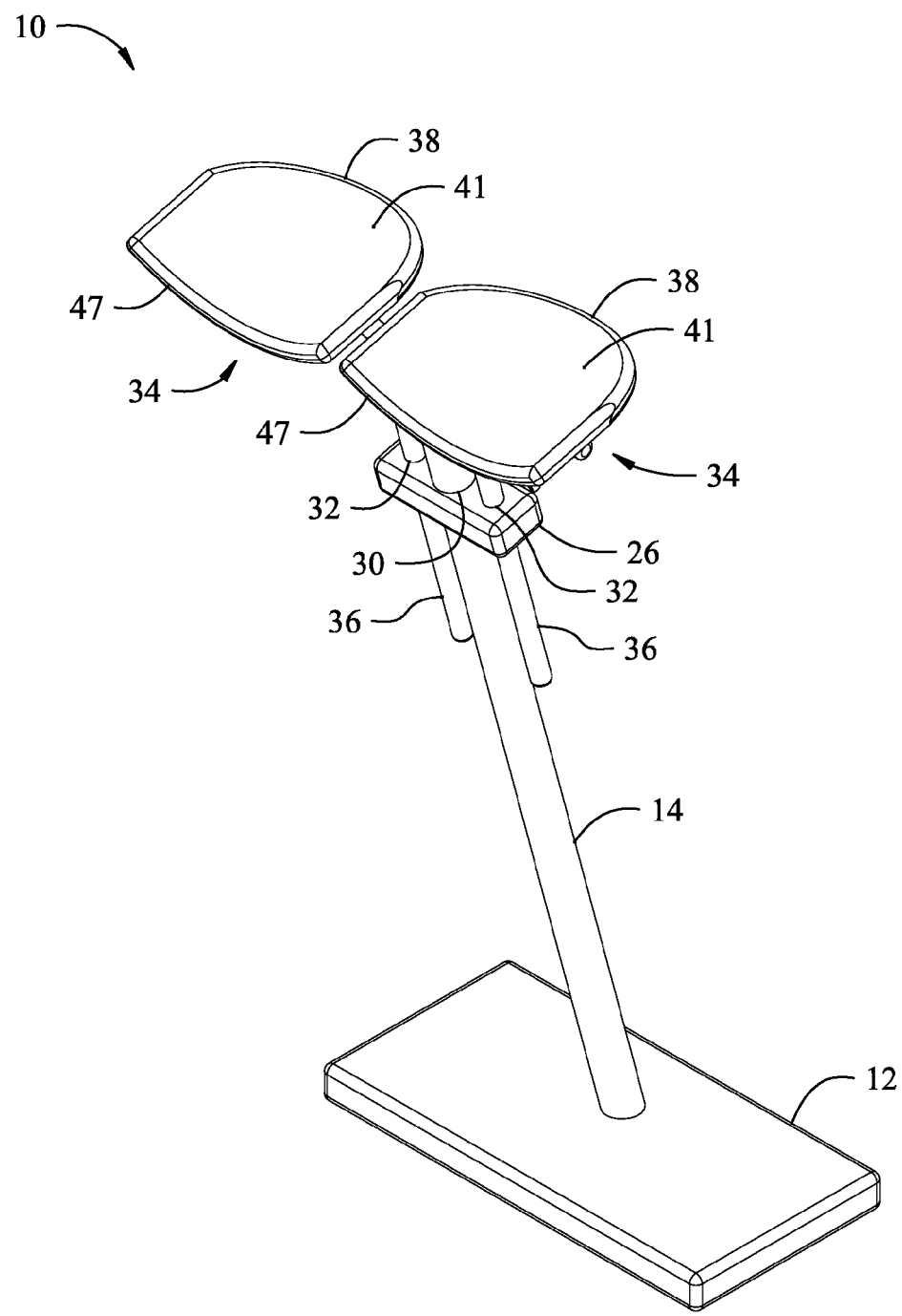
FIG. 1 is a rear top left perspective view of a preferred embodiment adjustable breast support apparatus.
Figure 2:
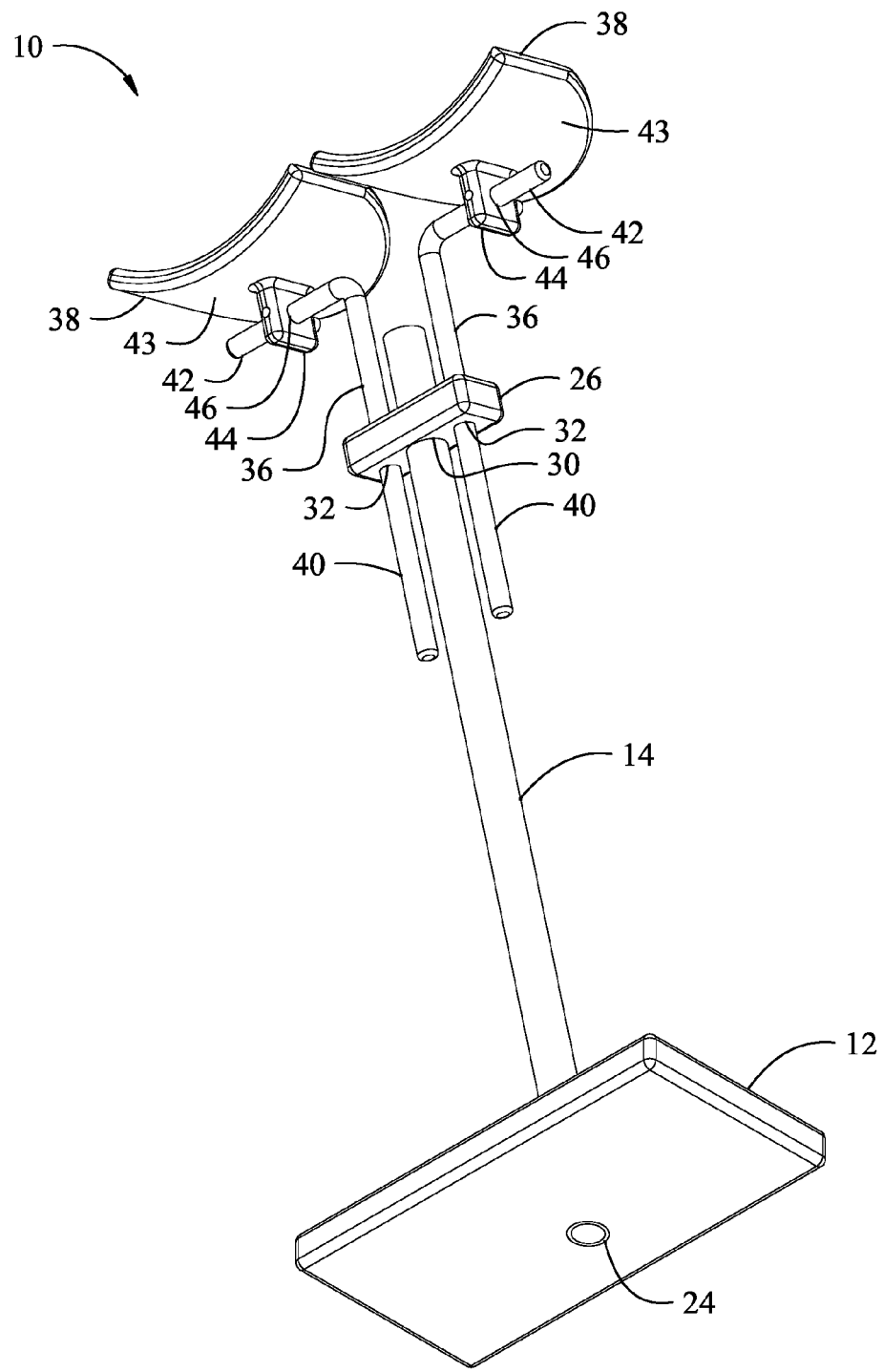
FIG. 2 is a rear bottom left perspective view thereof.
Figure 3:
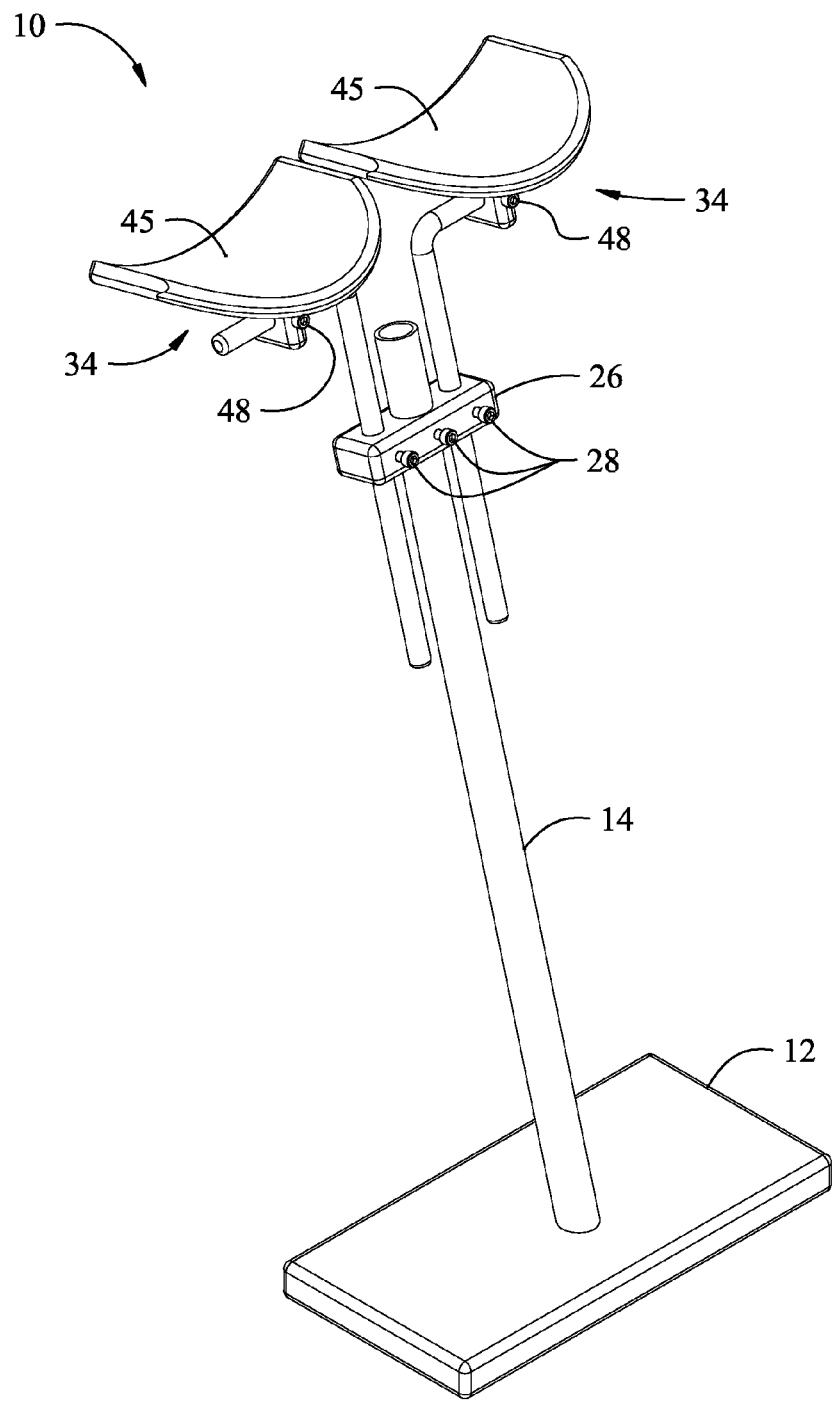
FIG. 3 is a front top left perspective view thereof.
Figure 4:
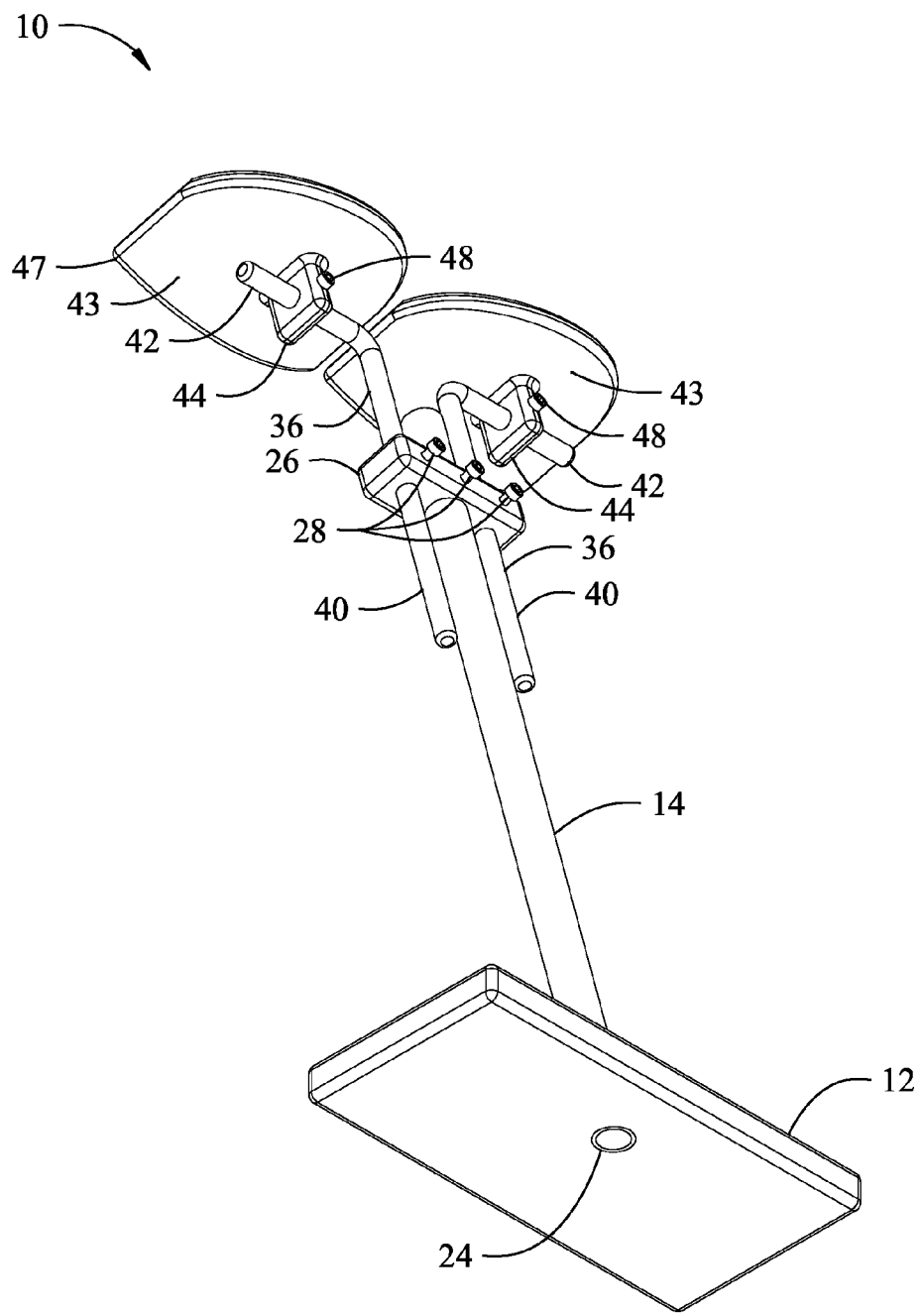
FIG. 4 is a front bottom left perspective view thereof.
Figure 5:
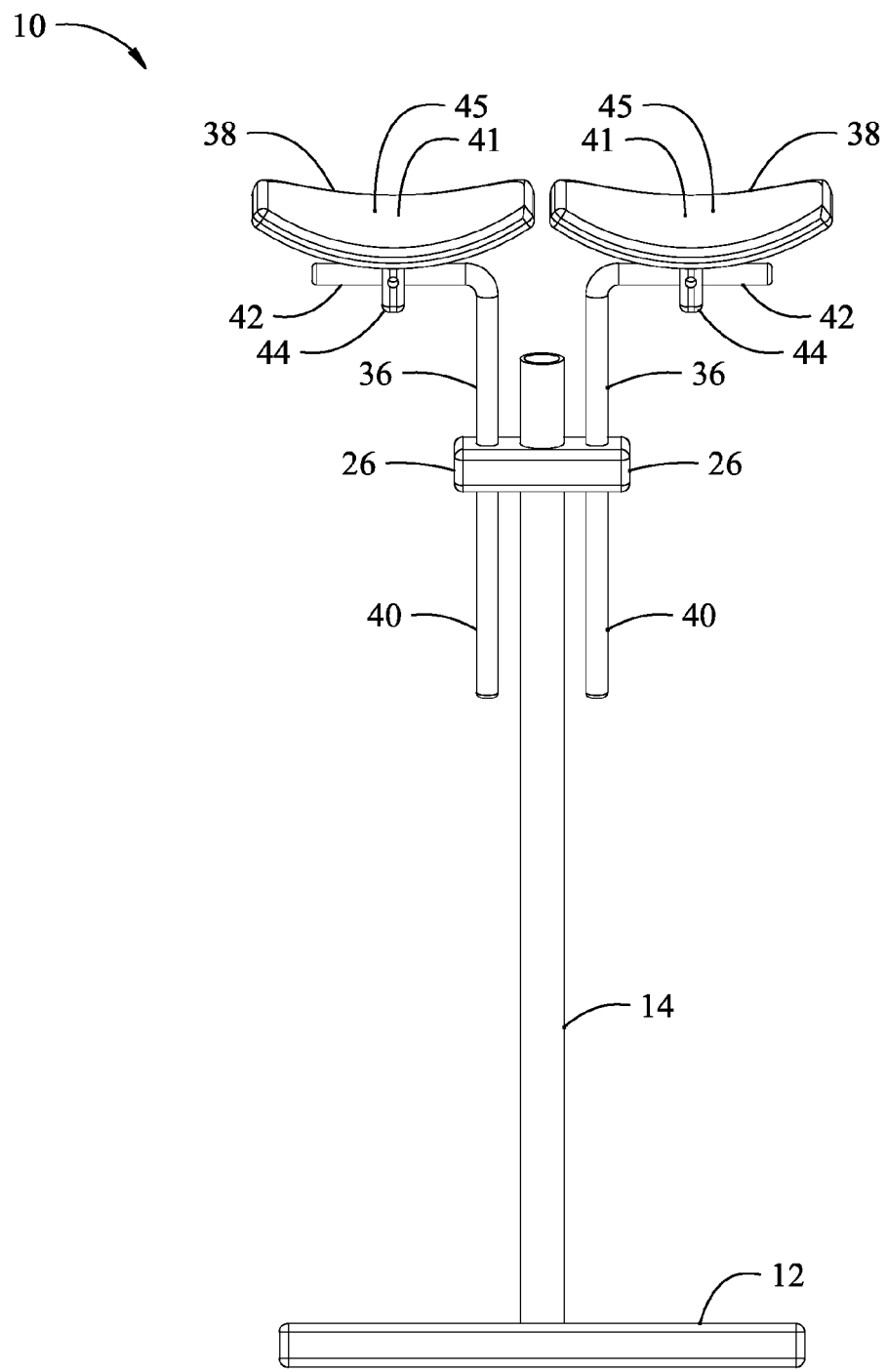
FIG. 5 is a rear plan view thereof.
Figure 6:
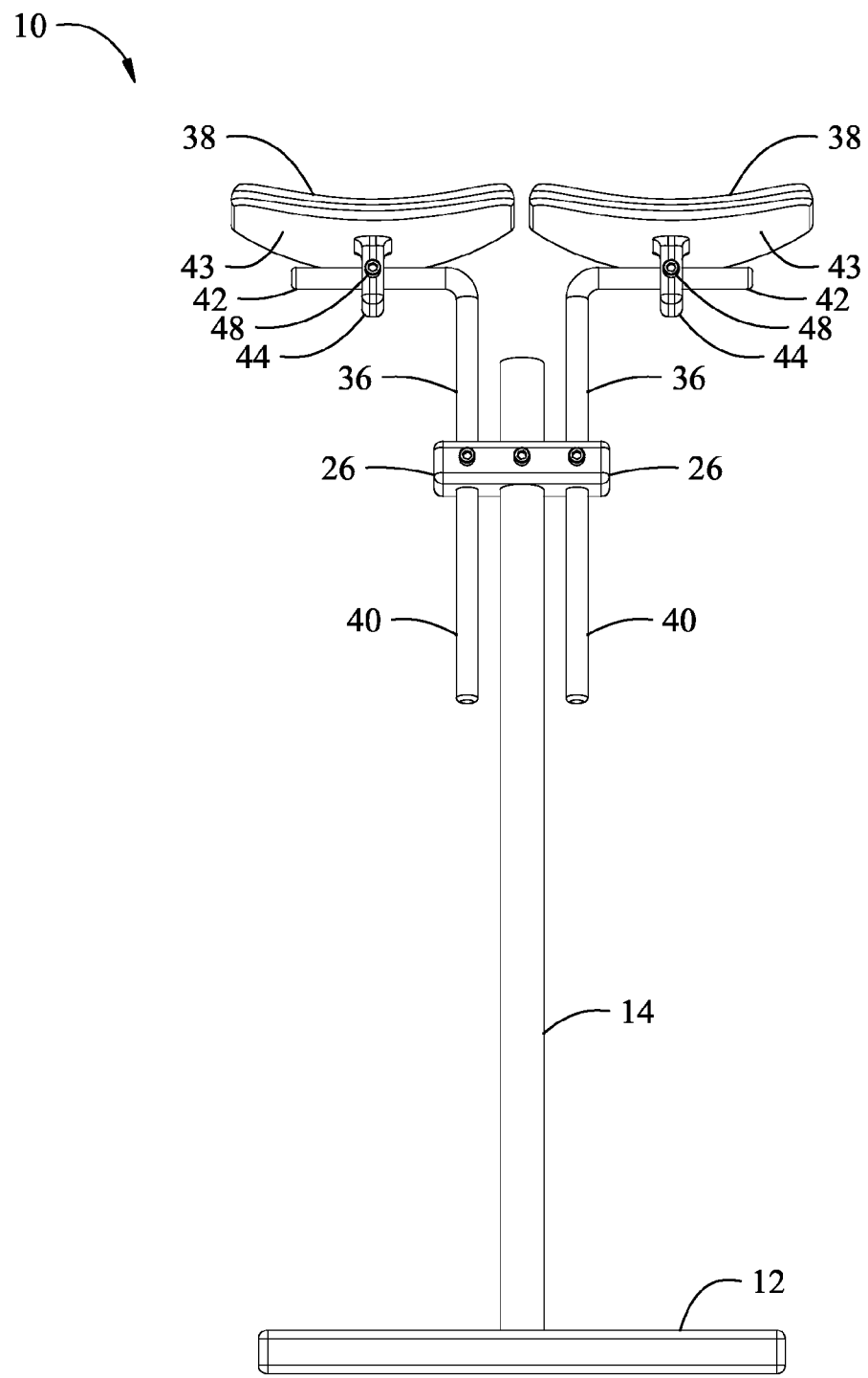
FIG. 6 is a front plan view thereof.
Figure 7:
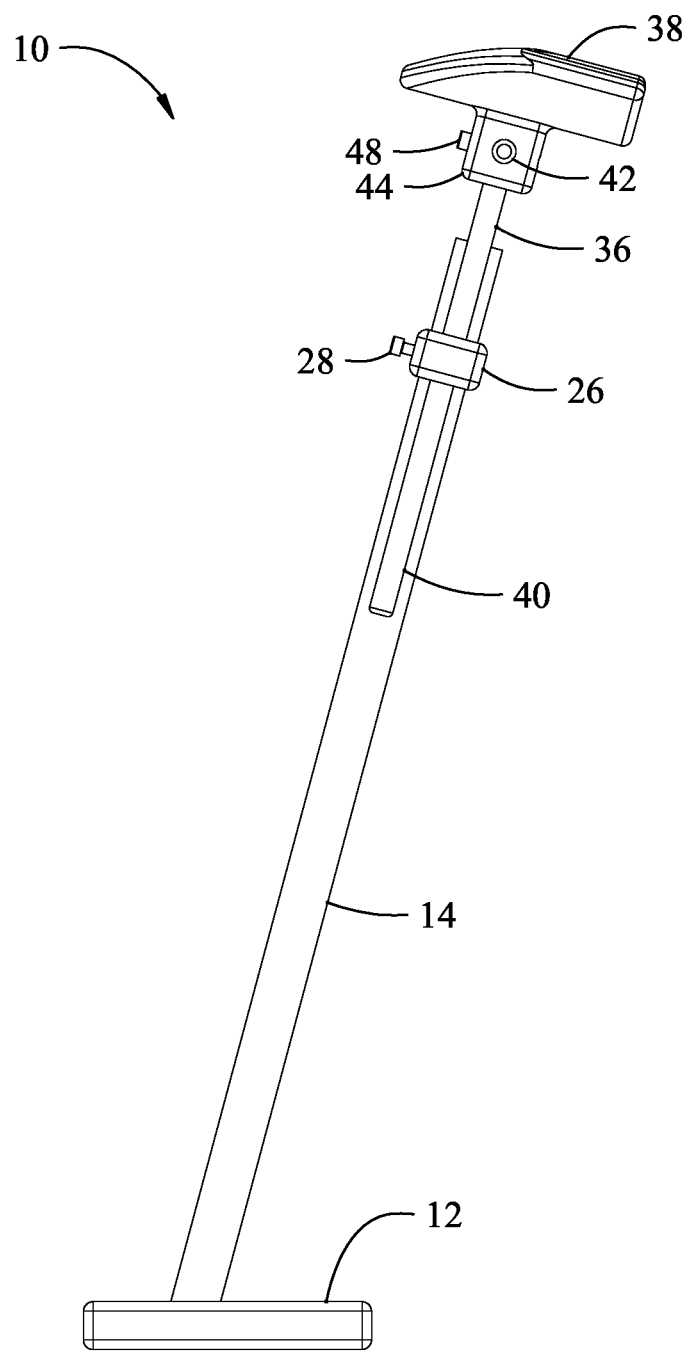
FIG. 7 is a right plan view thereof.
Figure 8:
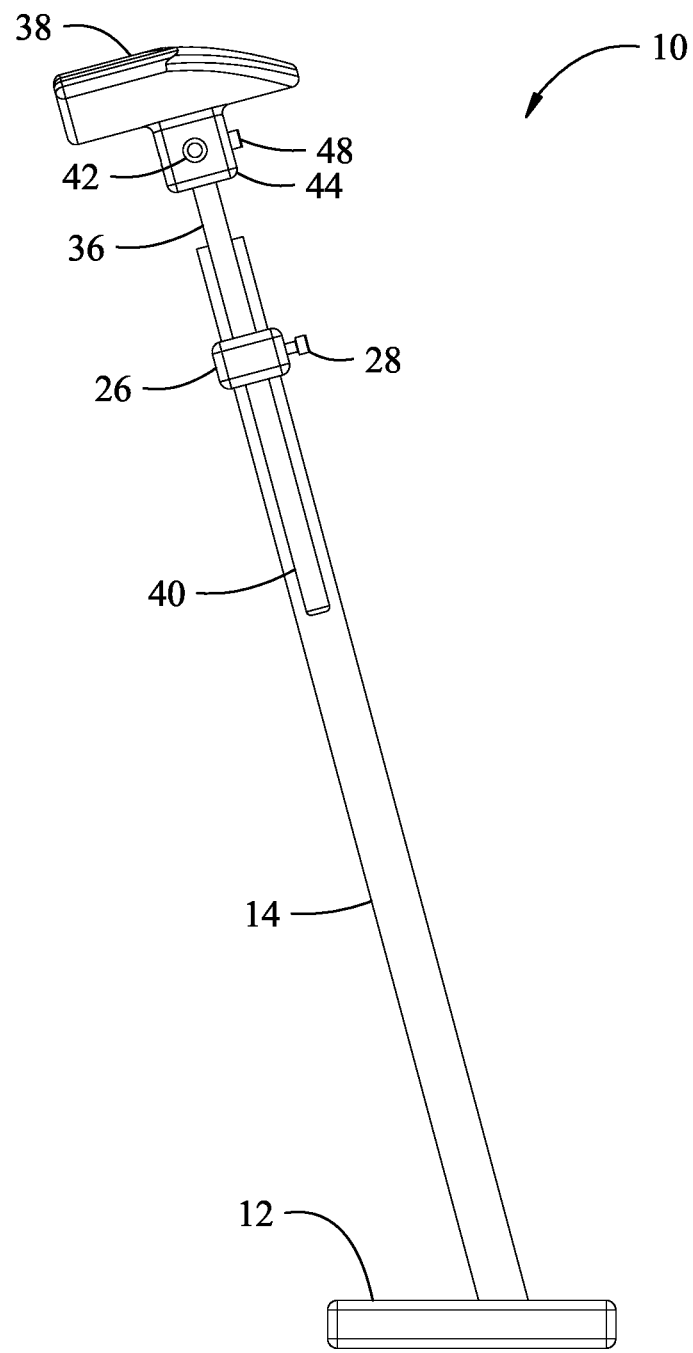
FIG. 8 is a left plan view thereof.
Figure 9:
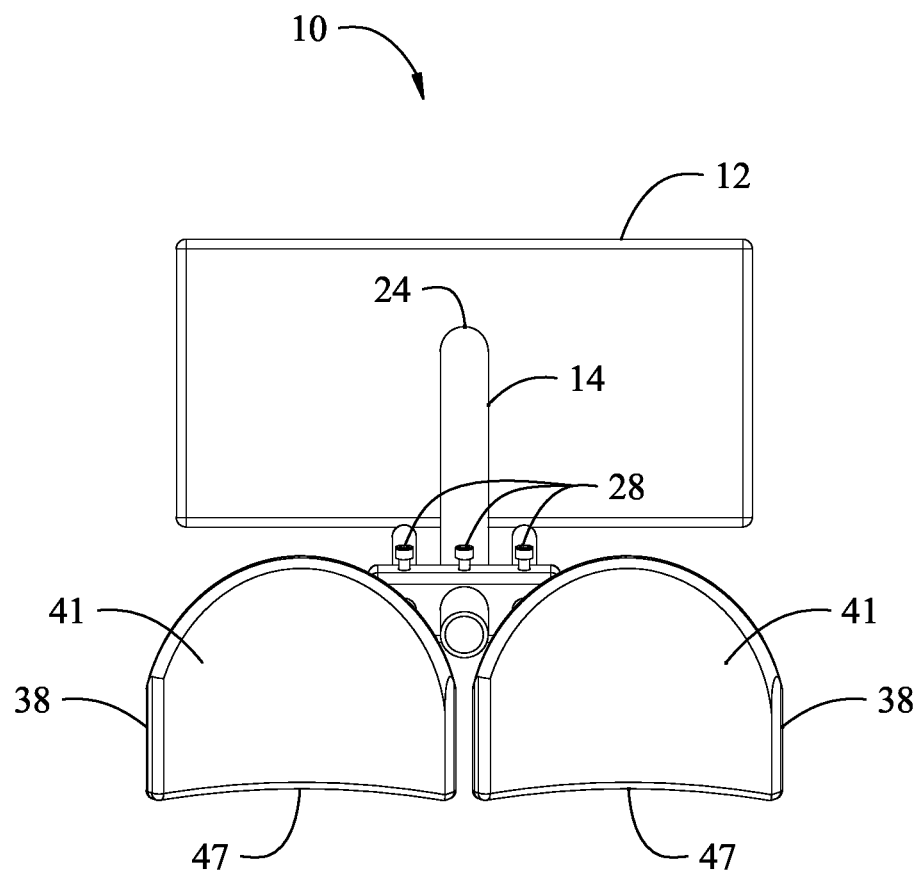
FIG. 9 is a top plan view thereof.
Figure 10:
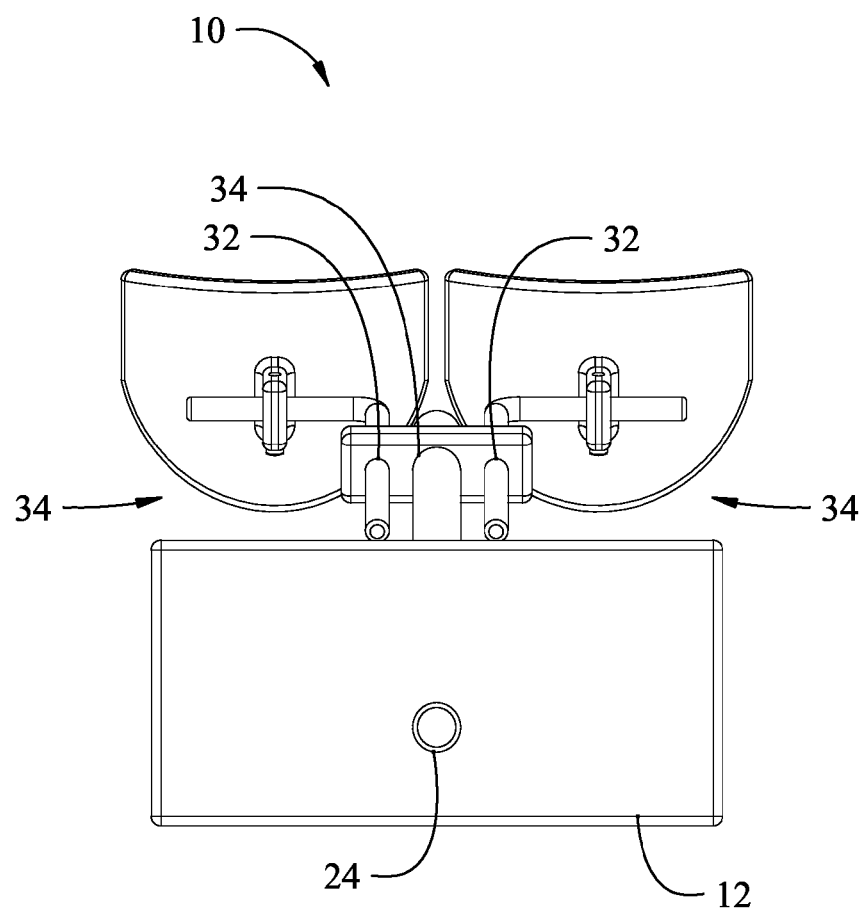
FIG. 10 is a bottom plan view thereof.
Figure 11:
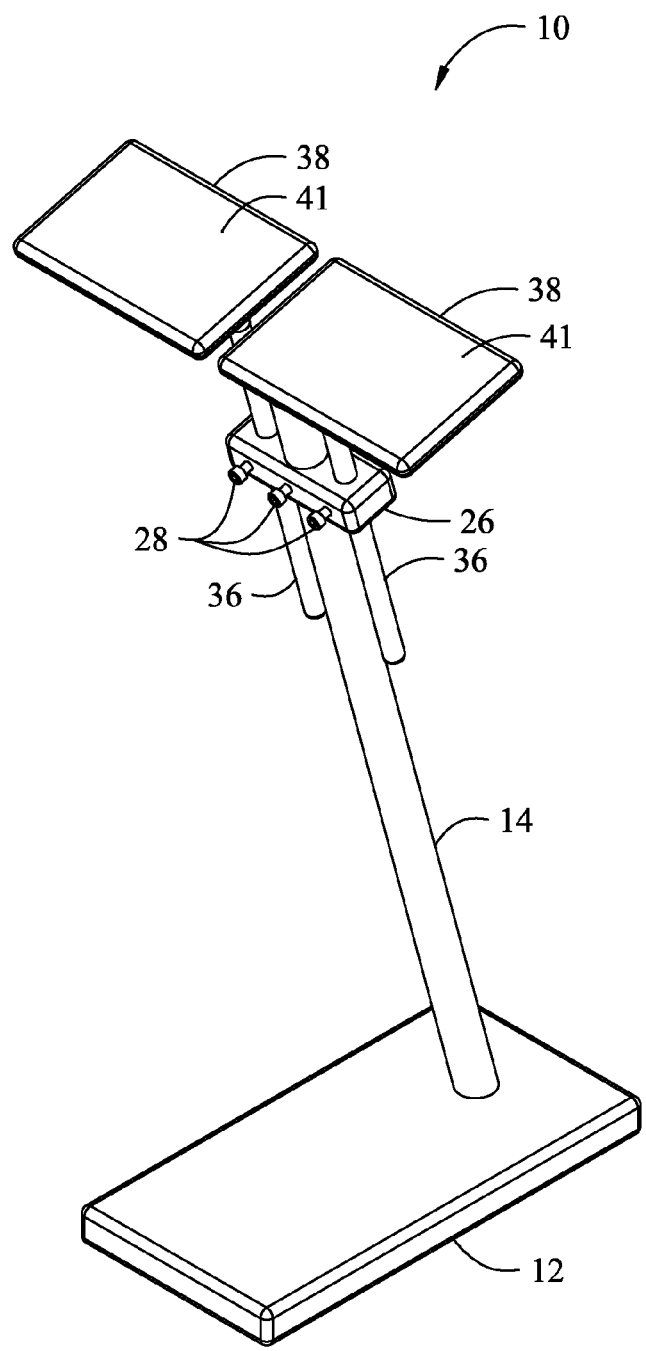
FIG. 11 is a rear top left perspective view of a first alternative embodiment of an adjustable breast support apparatus.
Figure 12:
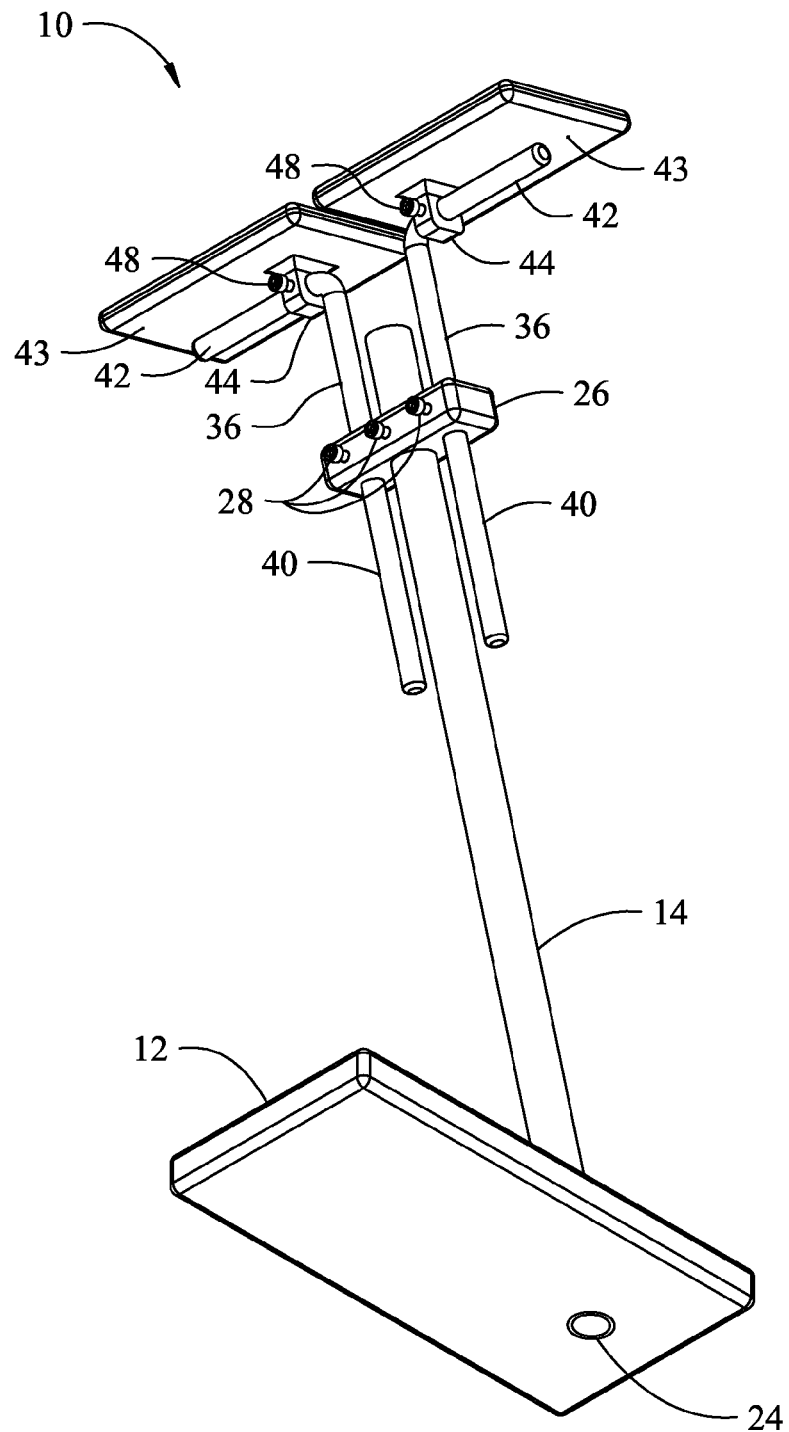
FIG. 12 is a rear bottom left perspective view thereof.
Figure 13:
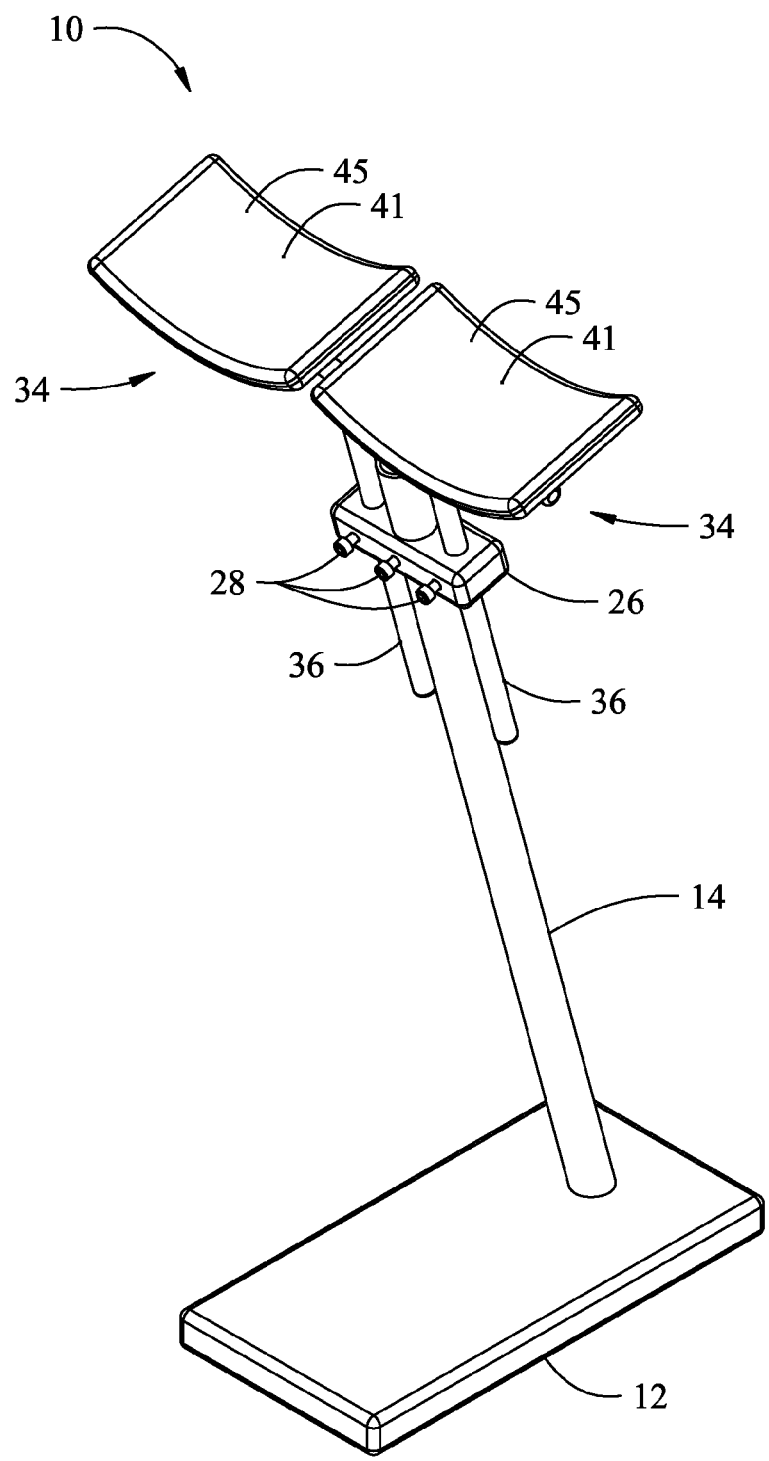
FIG. 13 is a rear top left perspective view of a second alternative embodiment of an adjustable breast support apparatus.
Figure 14:
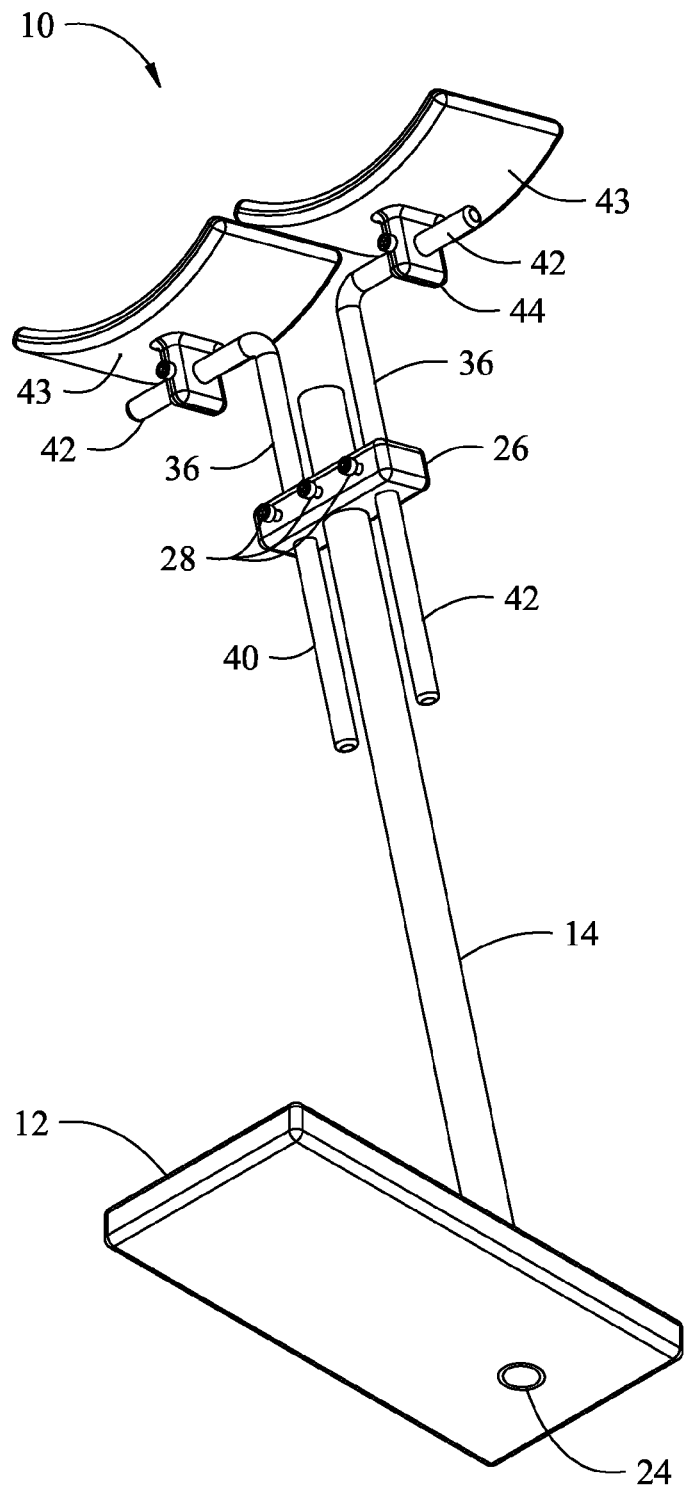
FIG. 14 is a rear bottom left perspective view thereof.
Figure 15:
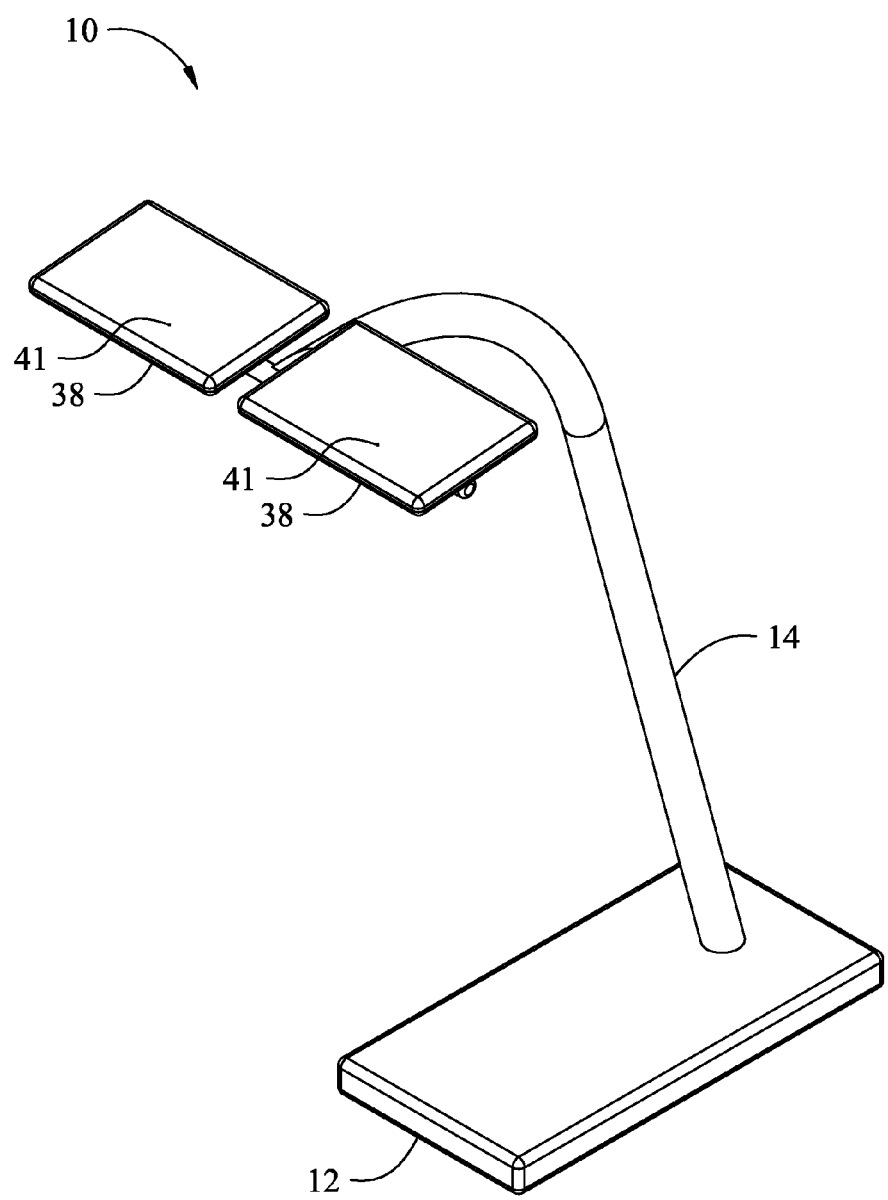
FIG. 15 is a is a front top right perspective view of a third alternative embodiment of an adjustable breast support apparatus.
Figure 16:
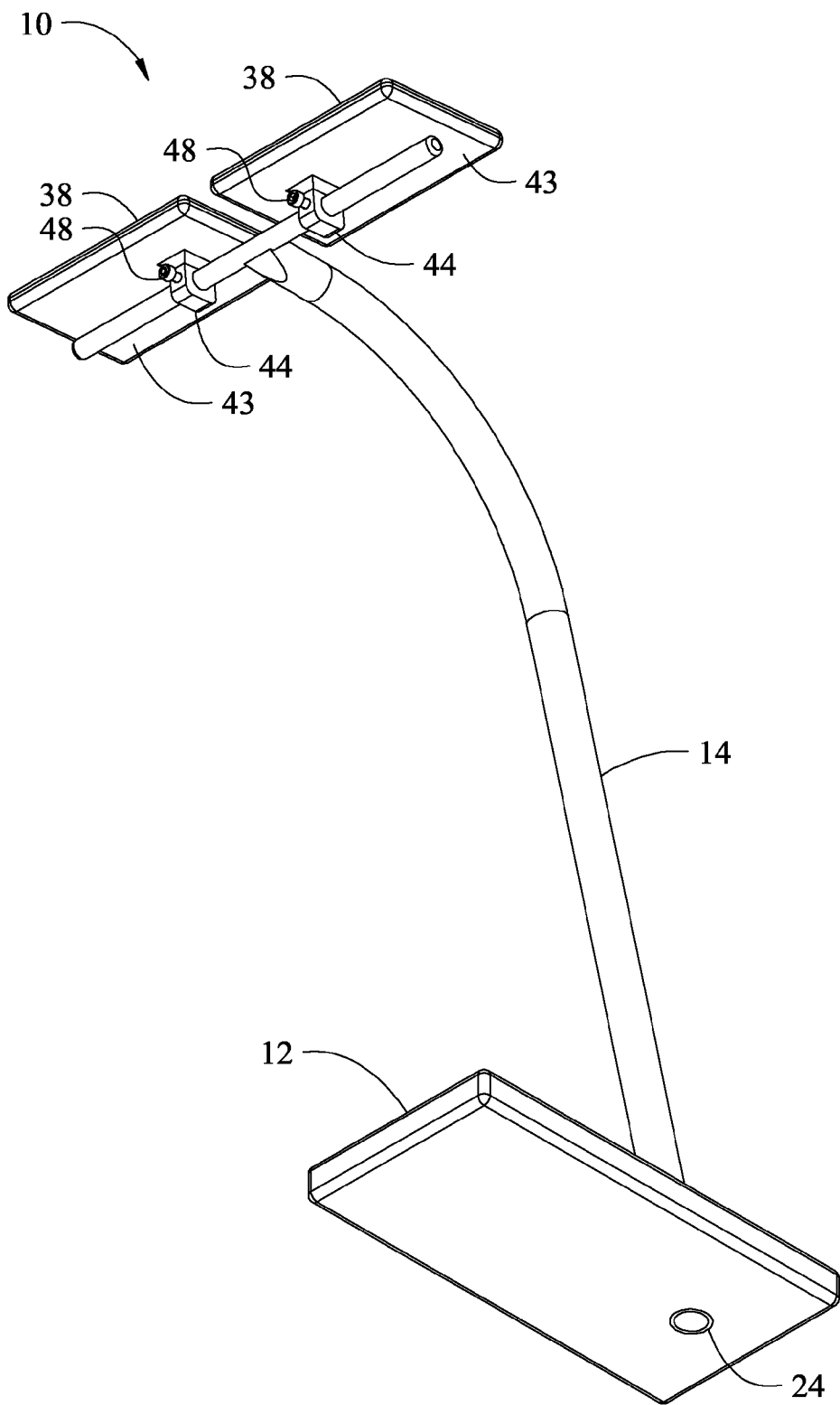
FIG. 16 is a front bottom right perspective view thereof.
Figure 17:
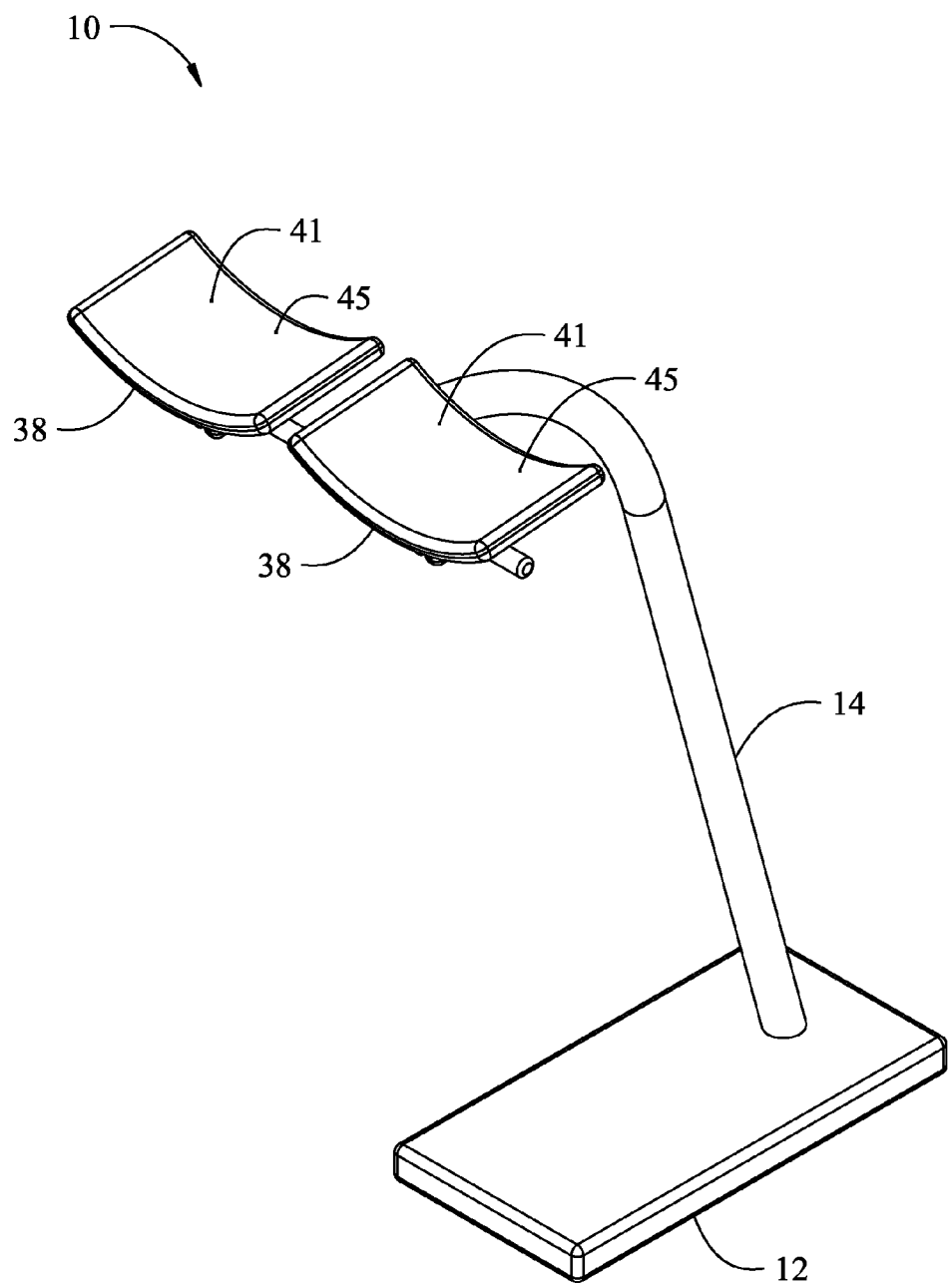
FIG. 17 is a is a front top right perspective view of a fourth alternative embodiment of an adjustable breast support apparatus.
Figure 18:
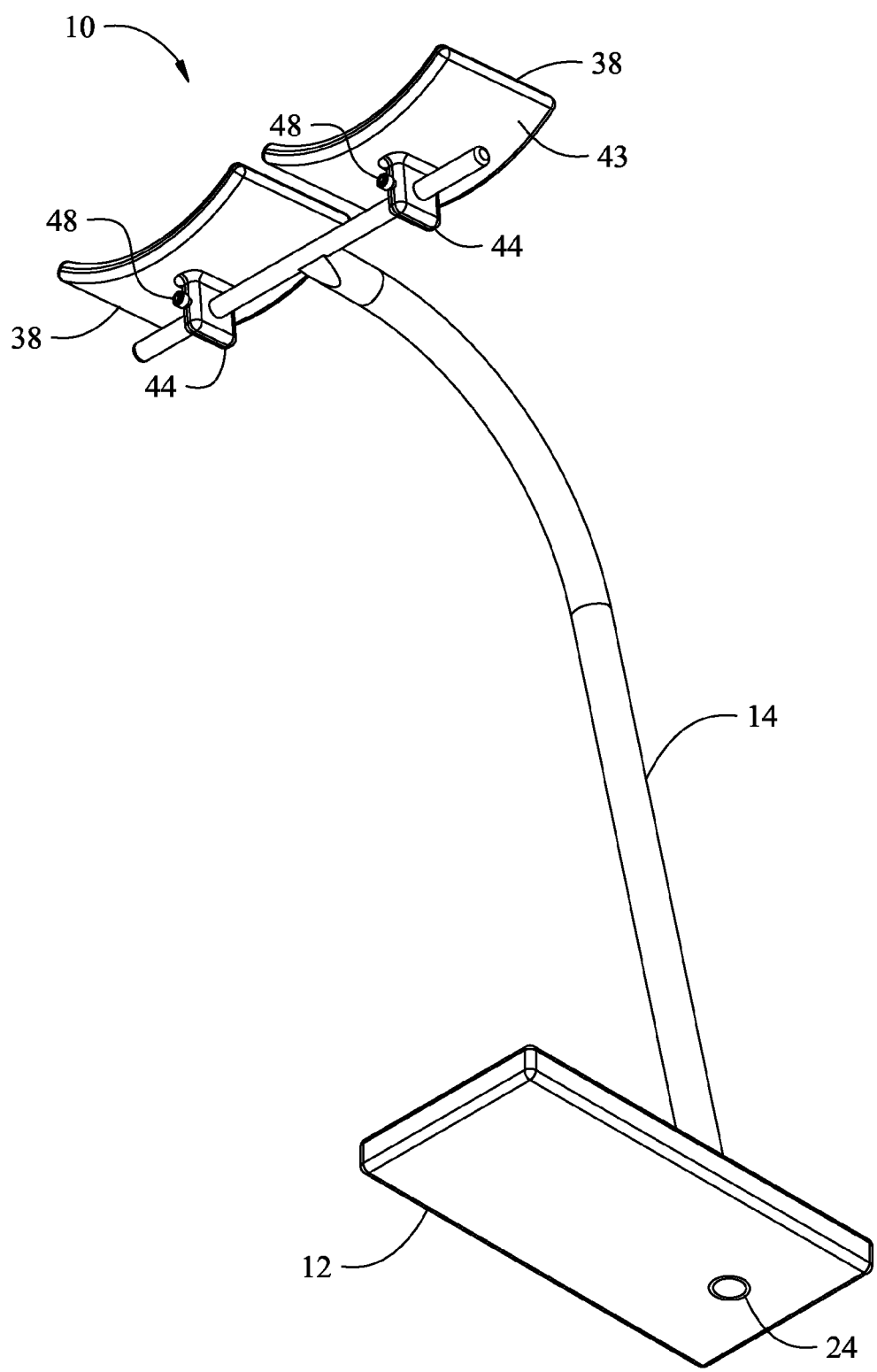
FIG. 18 is a front bottom right perspective view thereof.
Figure 19:
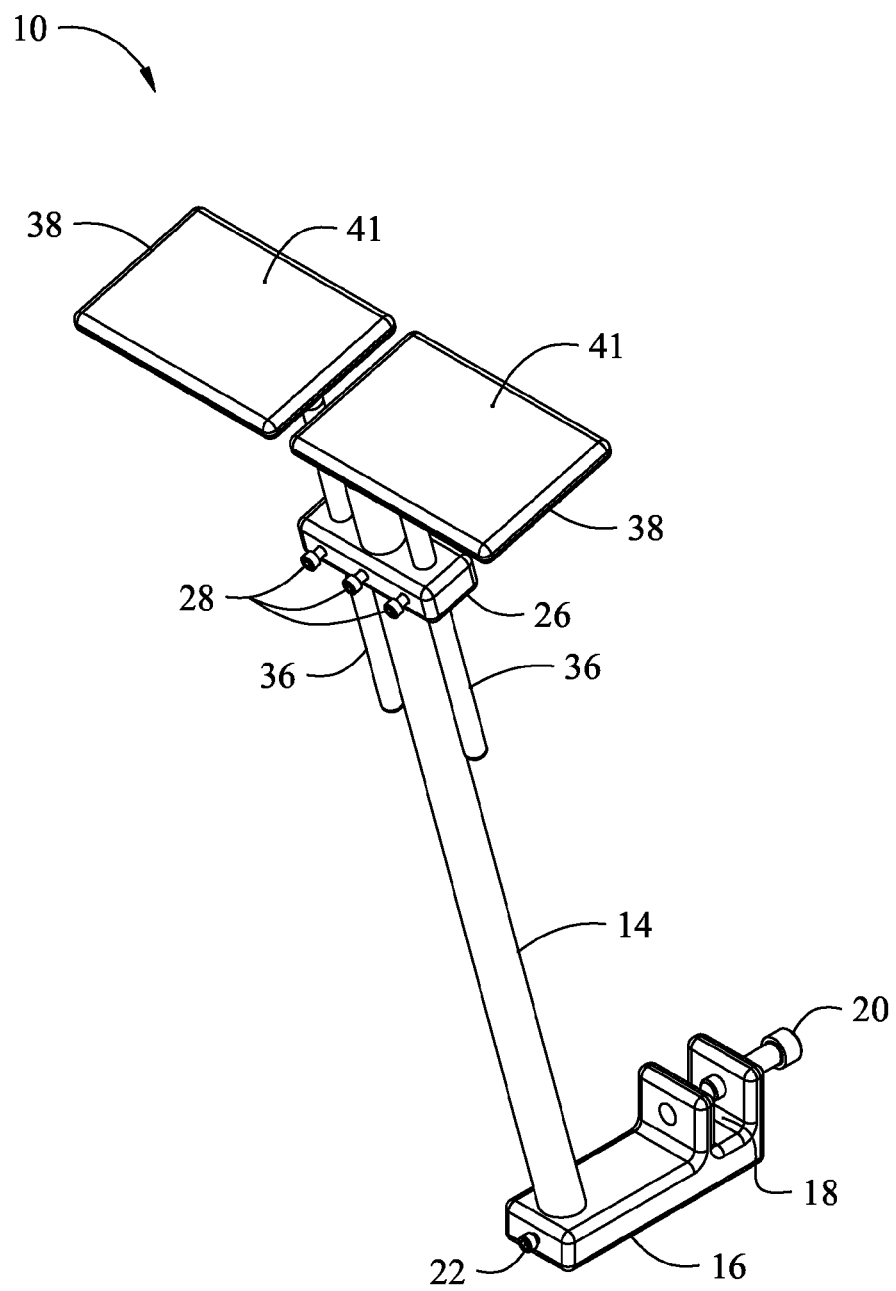
FIG. 19 is a is a front top right perspective view of a fifth alternative embodiment of an adjustable breast support apparatus.
Figure 20:
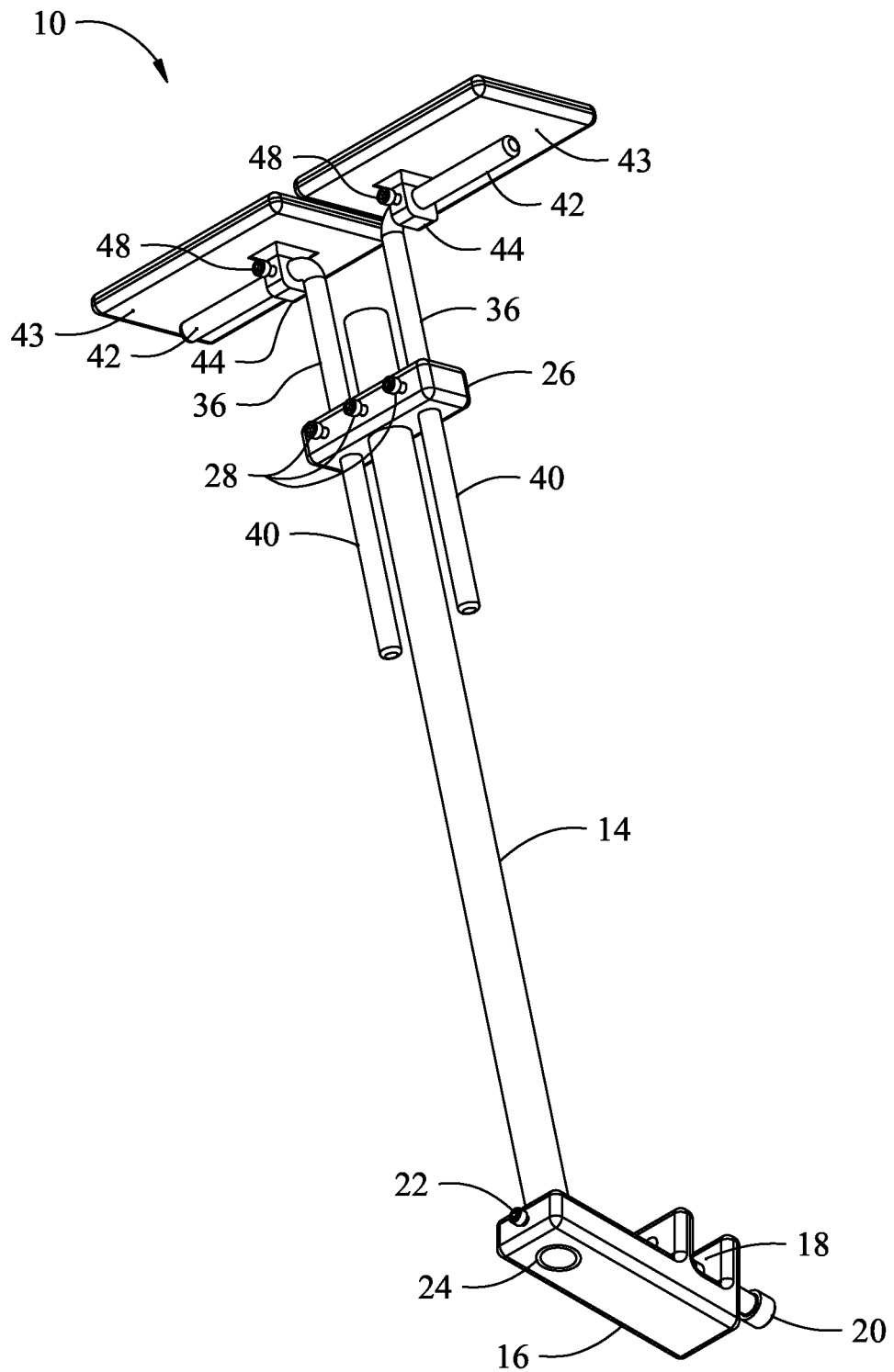
FIG. 20 is a front bottom right perspective view thereof.
Figure 21:
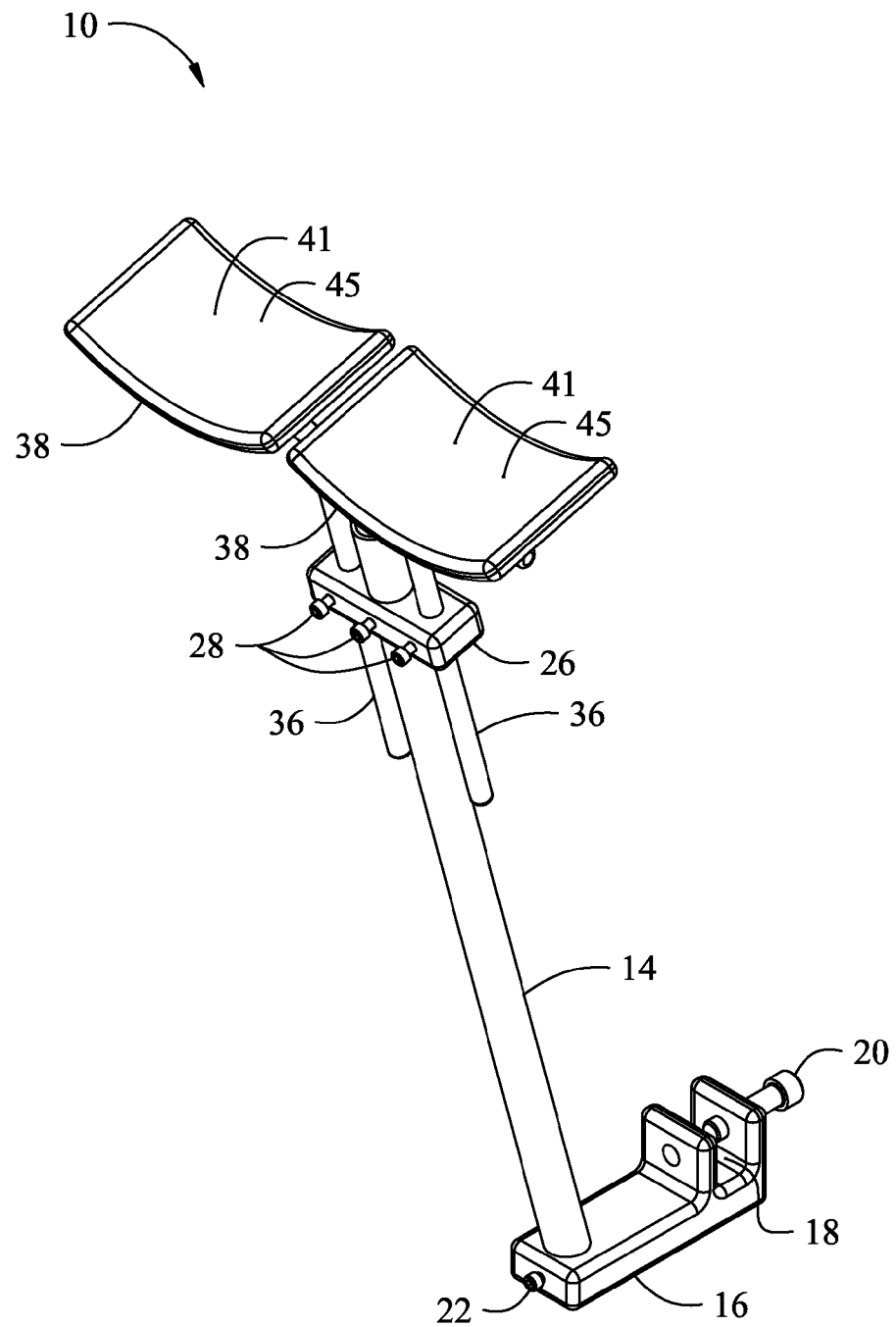
FIG. 21 is a is a front top right perspective view of a sixth alternative embodiment of an adjustable breast support apparatus.
Figure 22:
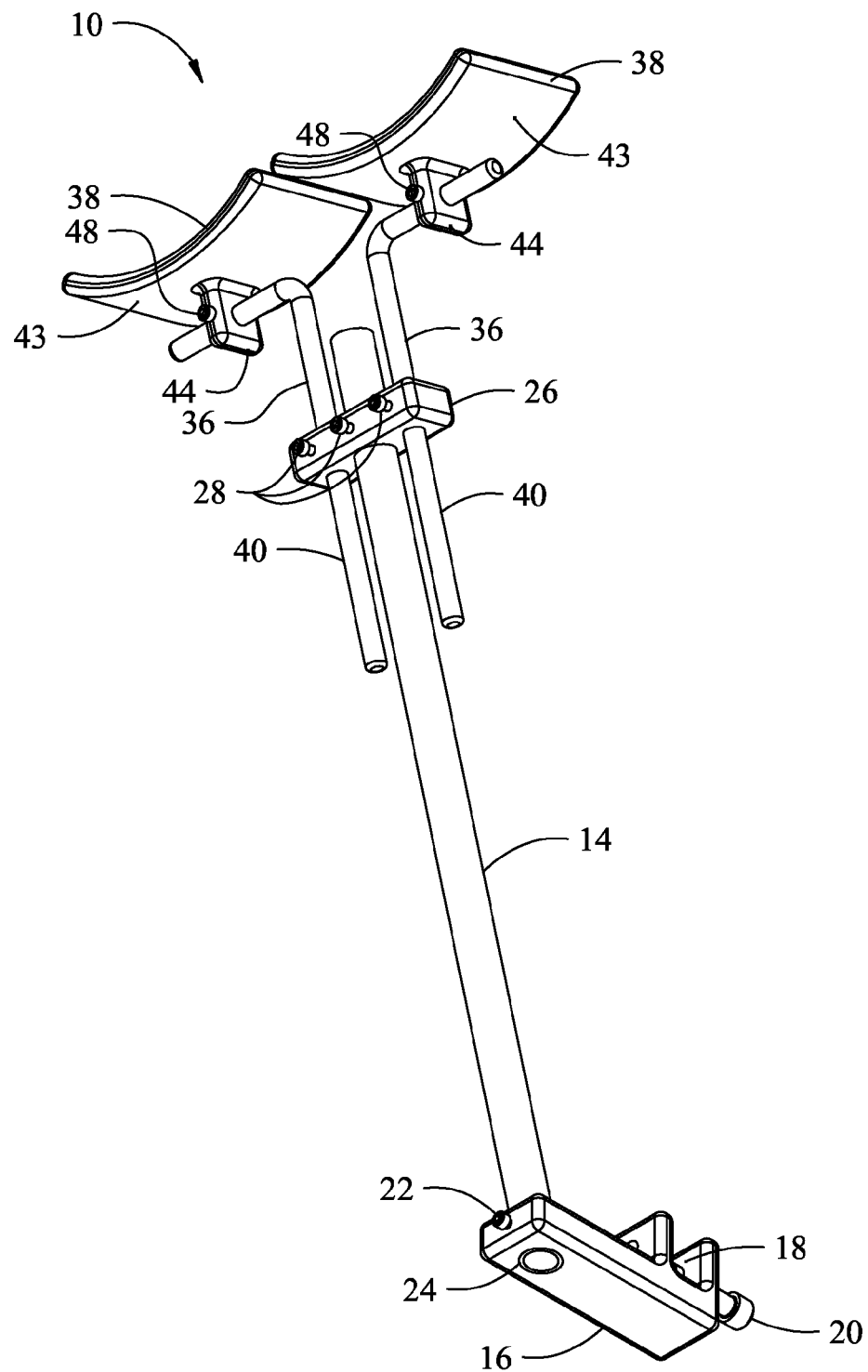
FIG. 22 is a front bottom right perspective view thereof.
Figure 23:
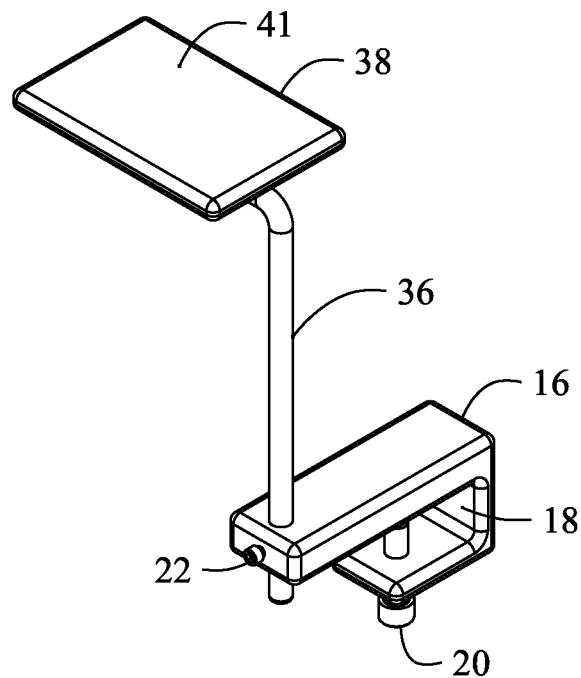
FIG. 23 is a is a front top right perspective view of a seventh alternative embodiment of an adjustable breast support apparatus.
Figure 24:
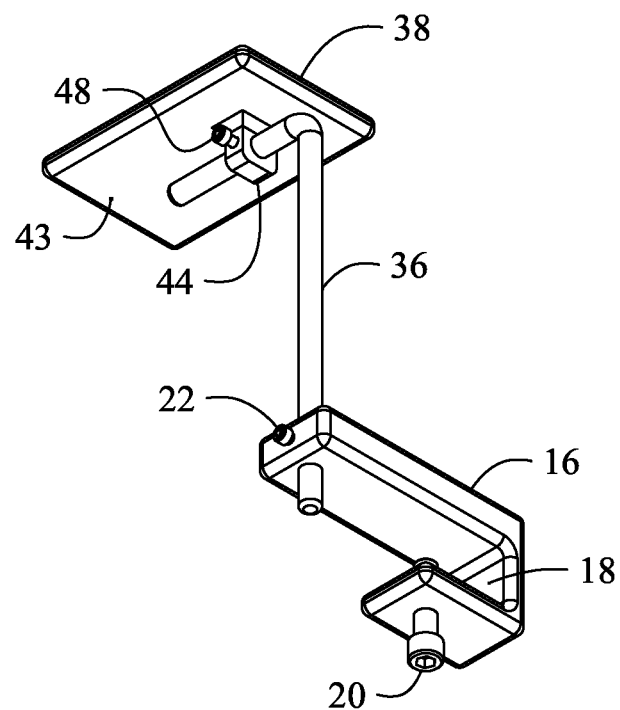
FIG. 24 is a front bottom right perspective view thereof.
Figure 25:
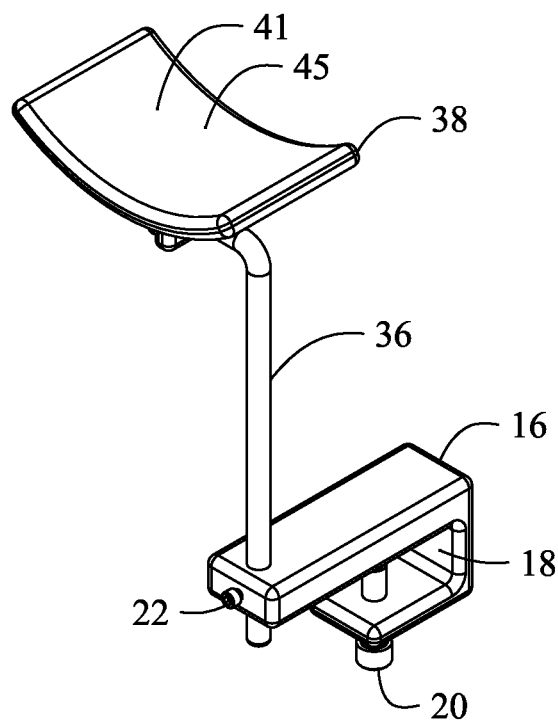
FIG. 25 is a is a front top right perspective view of an eighth alternative embodiment of an adjustable breast support apparatus.
Figure 26:
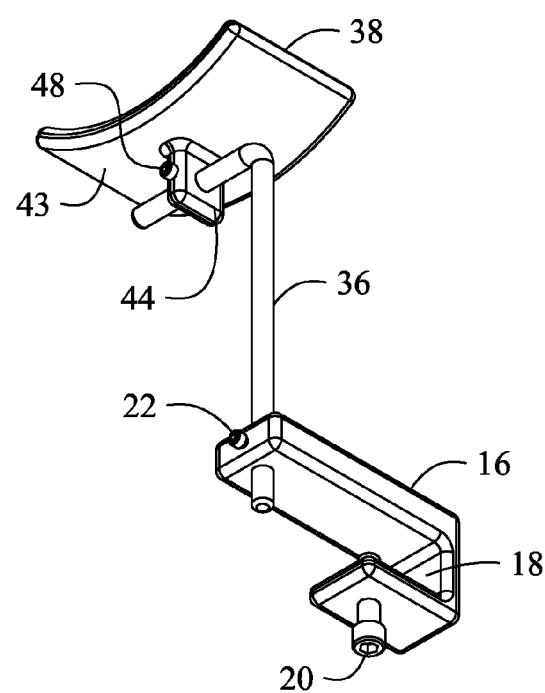
FIG. 26 is a front bottom right perspective view thereof.
Figure 27:
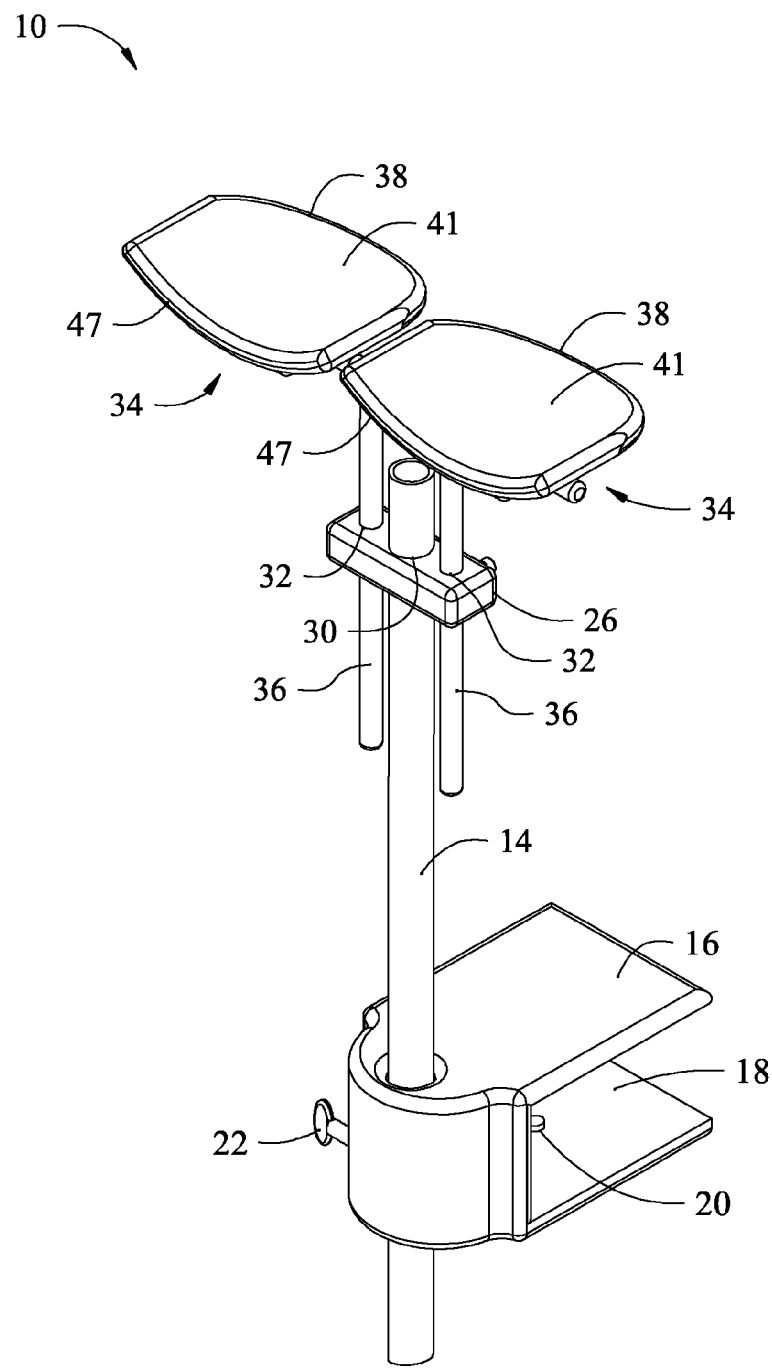
FIG. 27 is a is a front top right perspective view of a ninth alternative embodiment of an adjustable breast support apparatus which is especially useful with a tabletop or shelf.
Figure 28:
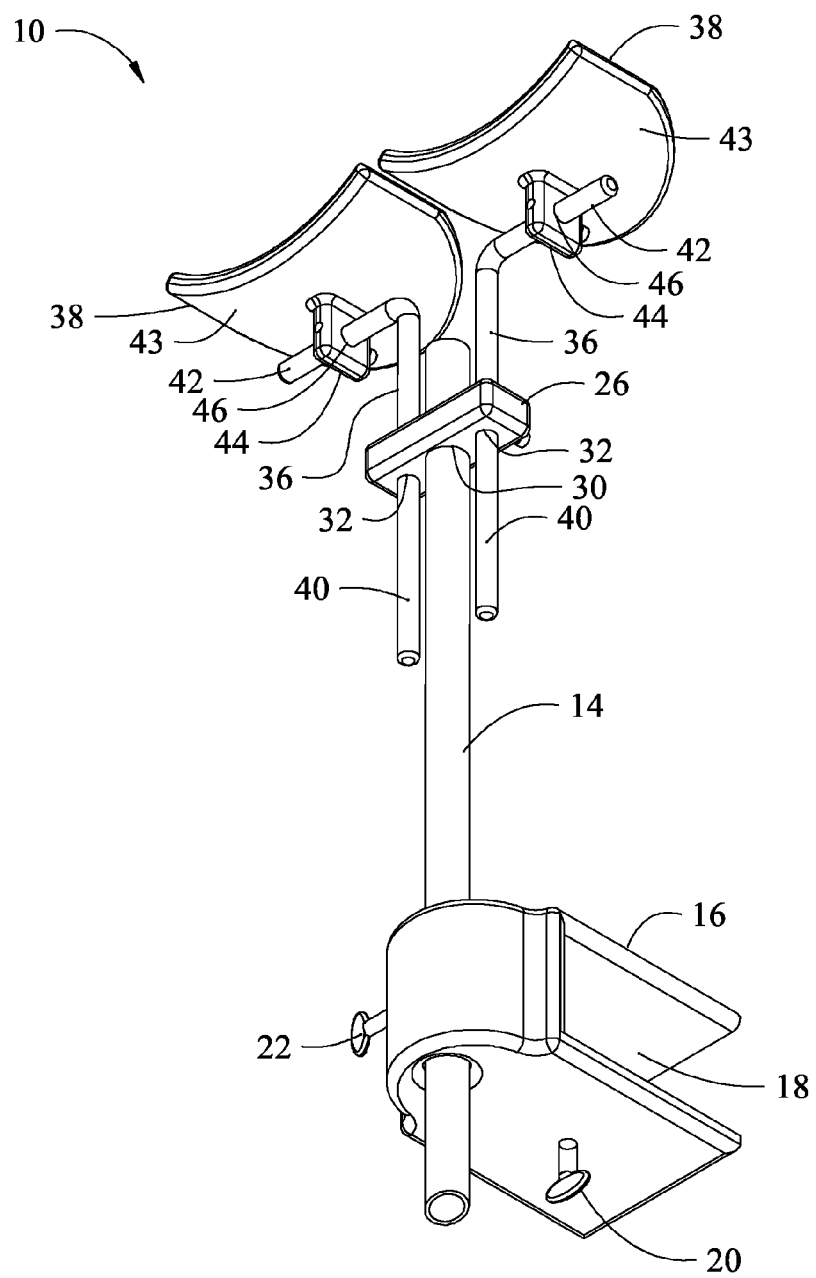
FIG. 28 is a front bottom right perspective view thereof.
Figure 29:
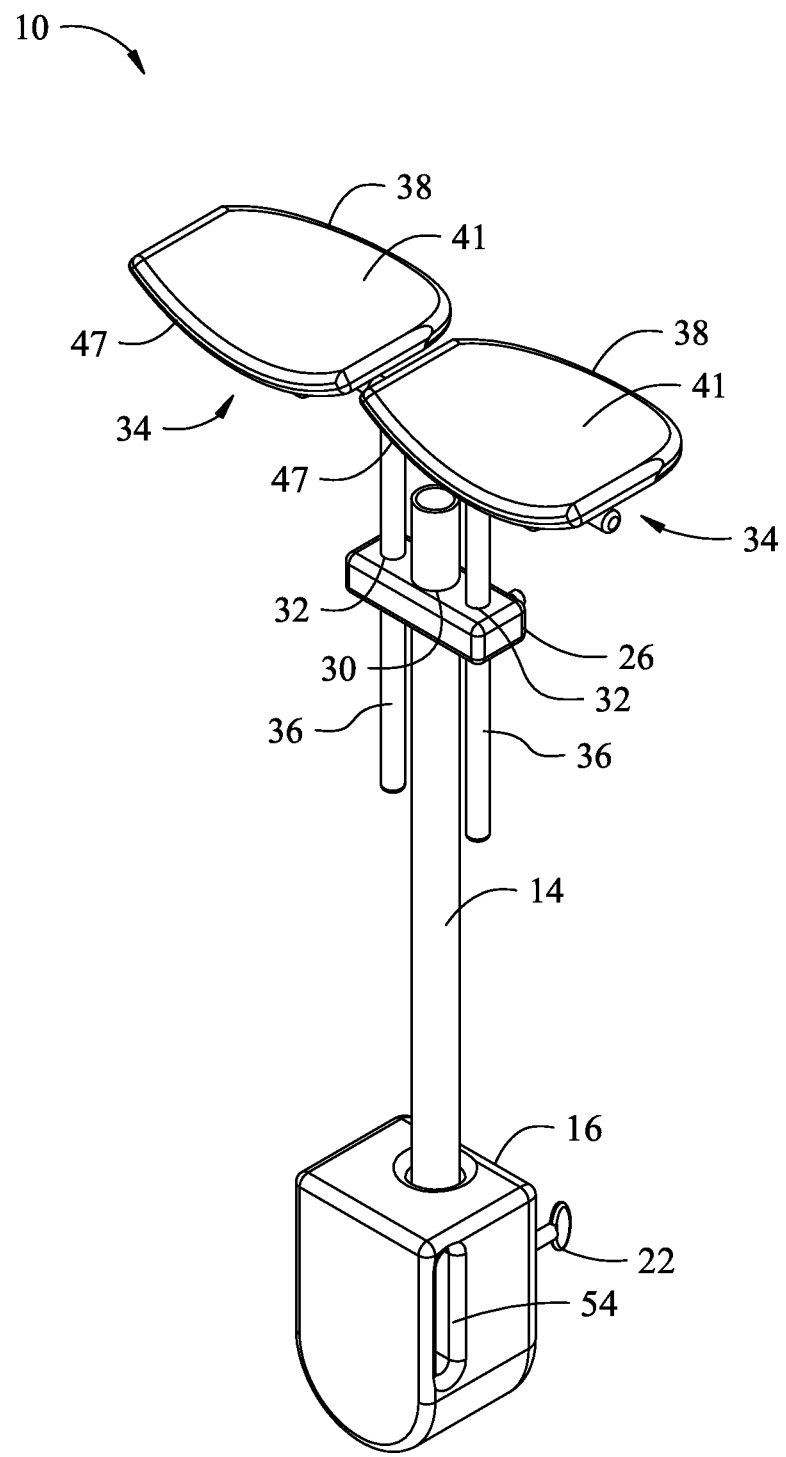
FIG. 29 is a is a front top right perspective view of a tenth alternative embodiment of an adjustable breast support apparatus which is especially useful with a user's belt.
Figure 30:
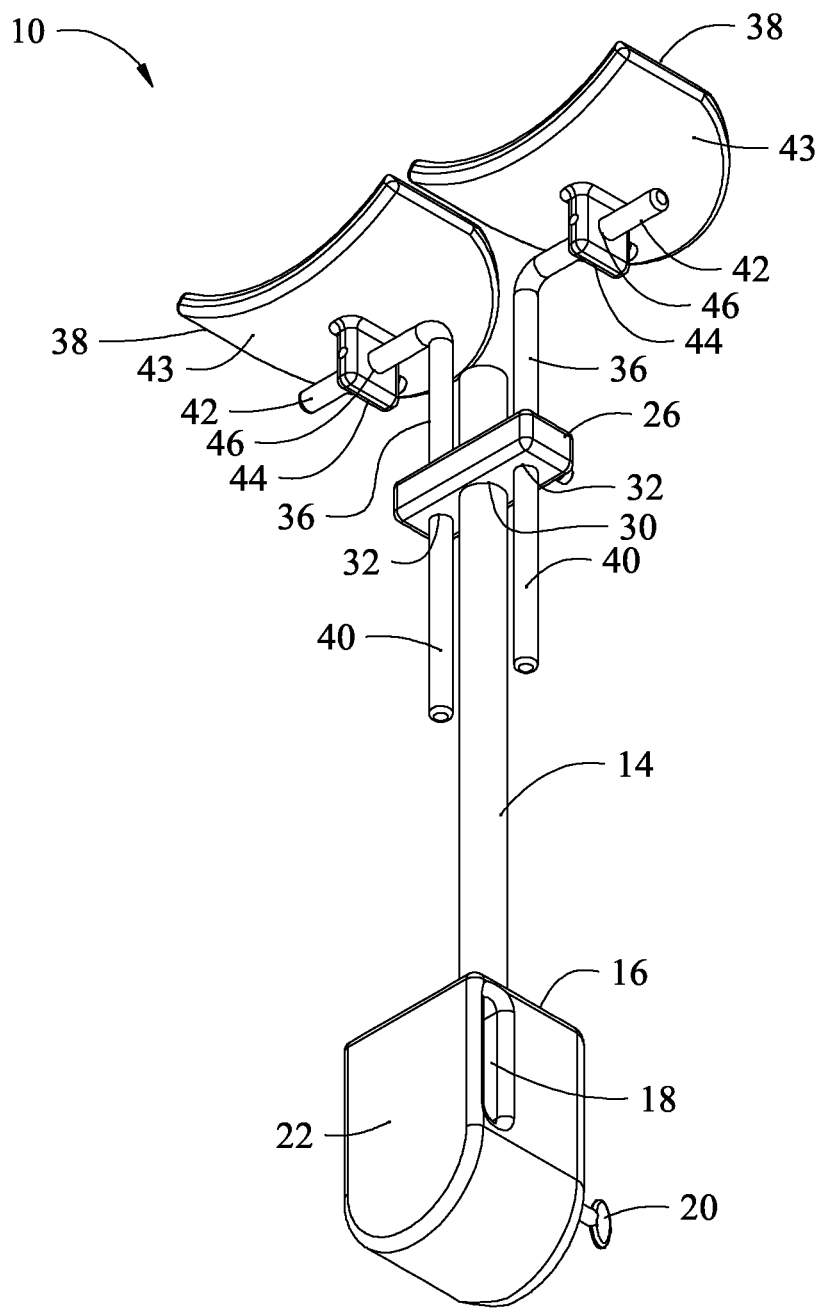
FIG. 30 is a front bottom right perspective view thereof.
Figure 31:
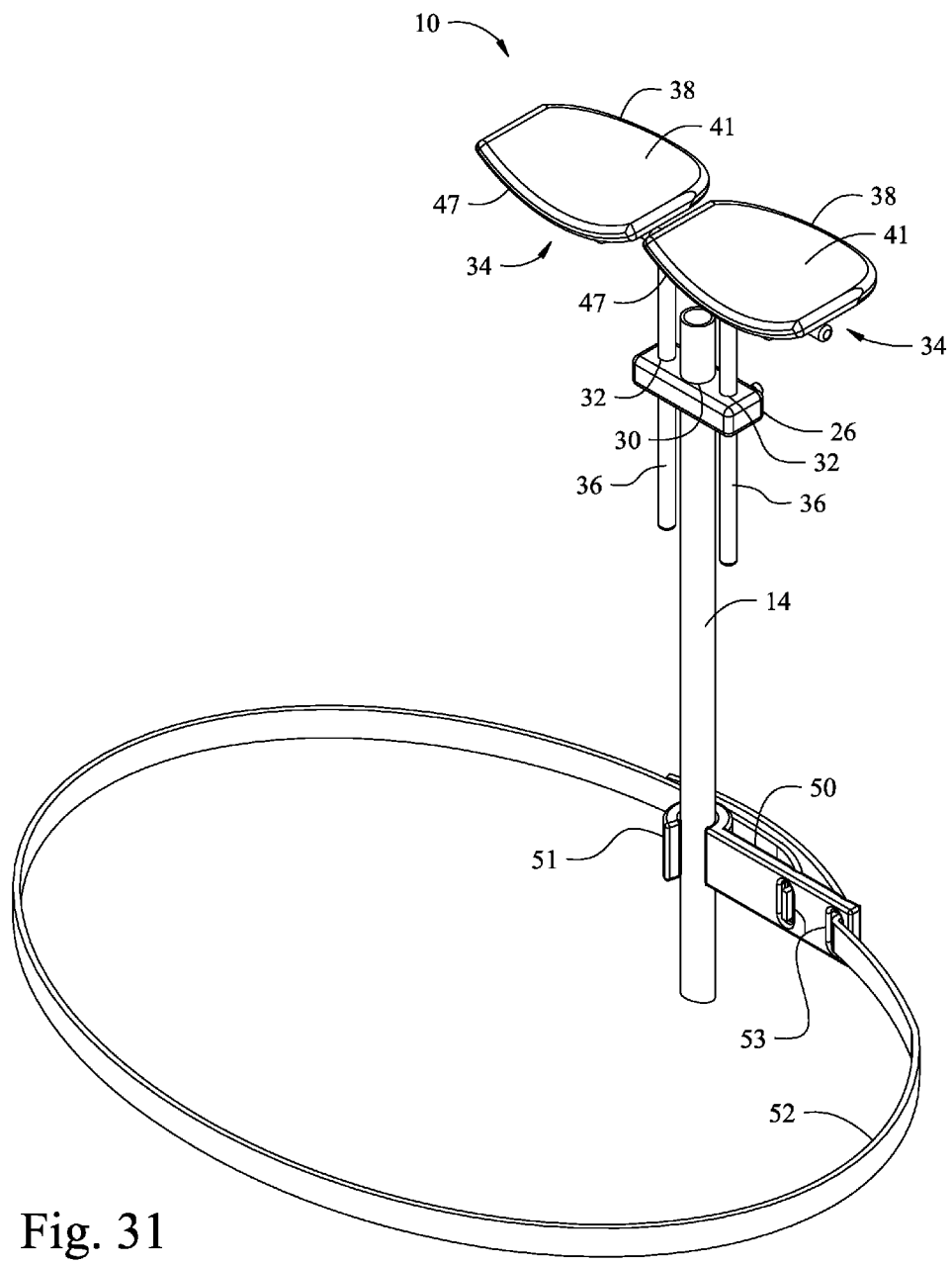
FIG. 31 is a is a front top right perspective view of a retaining strap holder and retaining strap within the environment of an adjustable breast support apparatus which is utilized to help stabilize the upright support.
Figure 32:
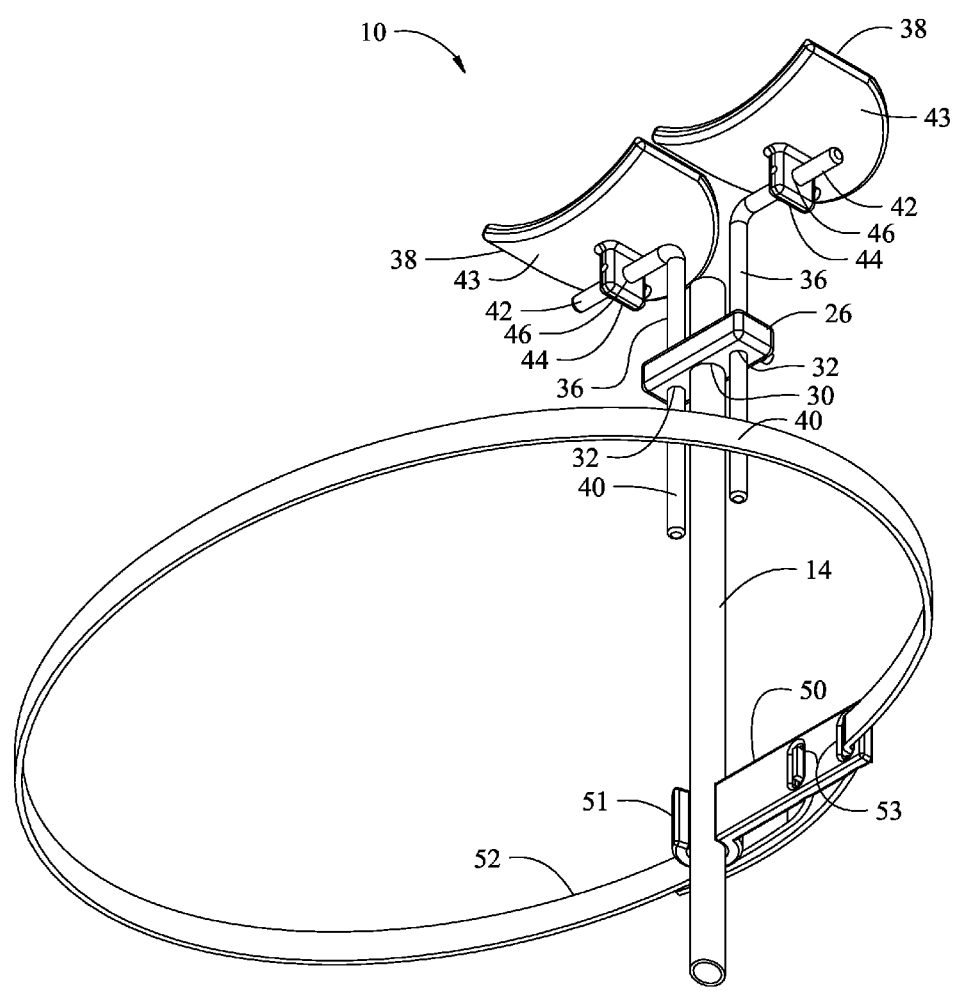
FIG. 32 is a front bottom right perspective view thereof.

Referring now to the drawings, there is shown in FIGS. 1-10 a preferred embodiment of an adjustable breast support apparatus 10, in FIGS. 11 & 12 a first alternative embodiment, in FIGS. 13 & 14 a second alternative embodiment, FIGS. 15 & 16 a third alternative embodiment, FIGS. 17 & 18 a fourth alternative embodiment, FIGS. 19 & 20 a fifth alternative embodiment, FIGS. 21 & 22 a sixth alternative embodiment, FIGS. 23 & 24 a seventh alternative embodiment, FIGS. 25 & 26 an eighth alternative embodiment, FIGS. 27 & 28 a ninth alternative embodiment, and FIGS. 29 & 30 a tenth alternative embodiment, and FIGS. 31 & 32 an embodiment of a retaining strap holder and strap which may be utilized with all embodiments. All embodiments of the present art have the same essential elements for breast support with slightly different variations of mounting, retention, and breast supporter 38 top surface 41 interface radius.

In its preferred form, the present art apparatus 10 comprises a base 12, an upright support 14, an attachment yoke 26, and a breast supporter assembly 34 having one or more breast supporters 38. The present art adjustable breast support apparatus 10 allows a person to support one or more of their breasts when seated without utilizing the muscles of the upper torso or back and without placing a strain upon the spine.

For the preferred embodiment and first and second alternative embodiments, the apparatus 10 comprises a base 12 having an upright support 14 which extends from said base 12 towards the breasts of a user when positioned properly. For the preferred embodiment, said upright support 14 slightly cants toward the user when properly positioned. That is, the upright support 14 is canted toward the user and away from perpendicular to the plane of the base 12 for the preferred embodiment. Alternative embodiments may place said upright support 14 at a plurality of angles relative to the base 12. For the preferred embodiment said upright support 14 is cylindrical in form but may have a plurality of cross sections including but not limited to rectangular, elliptical, or triangular. Alternative embodiments may utilize an upright support 14 which is telescoping or otherwise adjustable in height.

The base 12 has the form of a rectangular slab within the preferred embodiment. The base 12 is sized to easily and conveniently sit upon a table top or the lap or legs of a user. Alternative embodiments may utilize a base having a plurality of forms for attachment with a chair, table, or other structure. Further alternative embodiments of the base 12 may have a contoured or non-flat form in order to sit upon a user's lap or legs when in a sitting position. A support hole 24 is contained within said base 12 and allows the upright support 14 to mate with the base 12. Alternative embodiments may utilize a set screw, fastener, or other mechanical securing means within said base 12 to adjustably secure said upright support 14 with said base 12 or simply form the base 12 and upright support 14 as a single assembly.

For the preferred embodiment and first and second alternative embodiments, an attachment yoke 26 is adjustably positioned on said upright support 14 and secured with one or more yoke setscrews 28 or other mechanical fasteners or clamps. The attachment yoke 26 preferably has a center hole 30 through which the upright support 14 fits and moveably mates and is bound by one of said yoke setscrews 28. Said attachment yoke 26 further has one or more breast supporter assembly holes 32 into which a breast supporter assembly 34 slidably or movably mounts and is also secured by said yoke setscrews 28. Alternative embodiments may also utilize a plurality of mechanical fasteners in place and stead of said setscrew 28, including but not limited to clamps, slits and cam fasteners, or pins.

For the preferred embodiment and first and second alternative embodiments, said breast supporter assembly 34 comprises a substantially right angle member 36 having a first leg 40 which slidably mates with said breast supporter assembly hole 32 and a second leg 42 upon which a breast supporter 38 is moveably mounted. Each breast supporter 38 represents a top surface 41 having a flat or curved surface portion with an extension 44 on a bottom surface 43 having a breast support hole 46 through which said second leg 42 is slidably positioned and secured with a breast support setscrew 48. The top surface 41 is sized and shaped to gently and comfortably sit or seat beneath and support a breast during use of the apparatus 10. That is, the preferred embodiment top surface 41 has a proximal to distal partially "U" shaped or concave surface 45 within which the breast seats or sits and has a substantially "D" shape 47 to match the general shape of the breast. That is, the bottom of the "U" traverses from a proximal to distal location relative to the user.

The extension 44 allows the breast supporter 38 to be slidably and adjustably positioned upon the second leg 42 of the right angle member 36 in order to accommodate various distances or separations between the user's breasts. For the preferred embodiment, two breast supporter assemblies 34 are utilized in order to support both breasts of the user. Alternative embodiments may utilize only a single breast supporter assembly 34 with each base 12. For all embodiments, a plurality of mechanical fasteners or clamps may be utilized in place of said setscrew 48. This includes but is not limited to mechanical pins, clamps, or cam locking retainers. From the aforesaid description, it can be seen that each breast supporter 38 is individually adjustable for the user's breast height and the user's width between the breasts.

A fifth through eighth alternative embodiment base 12 comprises an arm 16 within which said upright support 14 is adjustably or moveably mounted within a support hole 24 and held with a support setscrew 22. A "U" channel 18 is positioned distally from said upright support 14 with a channel setscrew 20 through one of the legs of the "U" channel 18. For the fifth and sixth alternative embodiment, the open portion of the "U" is positioned upward or towards the same hemisphere within which the upright support 14 is located. The "U" channel 18 is sized to fit onto or around a table top, a chair arm, or other type of structure. The channel setscrew 20 is tightened to secure the base 12 with the structure between the legs of the "U" channel 18. The seventh and eighth alternative embodiment places or co-locates a leg of the "U" with the arm 16 and positions the open portion of the "U" horizontally or towards the end of the arm 16 where the upright support 14 is movably located. For the present art, a plurality of mechanical fasteners may be utilized in the place and stead of said setscrews, including but not limited to pins, quick disconnects, or clamps.

A third and fourth alternative embodiment forgoes use of said attachment yoke 26 and simply positions the breast supporter 38 upon said second leg 42 of said right angle member 36. The third and fourth alternative embodiment incorporates said second leg 42 as an extension of said upright support 14. That is, the upright support 14 has said second leg 42 positioned there upon substantially opposite said base 12 as a substantially right angle member. The third and fourth alternative embodiment upright support 14 also has a bend therein to optimally position the breast supporters 38 relative to said base 12. Said bend is preferably nearer the breast supporter(s) 38 than the base 12 for ease of use.

The ninth alternative embodiment utilizes a base 12 having a slightly modified support arm 16 which also has a "U" channel 18 for securement of the apparatus 10 to a tabletop, table, or chair. For this embodiment, the "U" channel 18 is also positioned distally from said upright support 14 with a channel setscrew 20 through one of the legs of the "U" channel 18. Nevertheless, the open portion of the "U" is positioned distally or away from the user during use. This slight variation allows the user to easily attach the arm 16 to a tabletop or chair. A support setscrew 22 also attaches the arm 16 and upright support 14.

The tenth alternative embodiment slightly modifies the base 12 or support arm 16 whereby a belt channel 54 traverses the base 12 or support arm 16 and allows a user's belt to fit there through for support of the upright support 14 during use. The belt channel 54 has a cross sectional shape slightly larger than a conventional person's belt whereby a user's belt may easily slide through the arm 16. A support setscrew 22 is also provided for retention of the upright support 14.

FIGS. 30 & 31 show the retaining strap holder 50 and a retaining strap 52 which are utilized with any embodiment for better and more stable retention of the apparatus 10 during use. The retaining strap holder 50 has a distal partial arcuate retainer 51 which quickly and easily fits around the upright support 14 and provides an additional retention point for the apparatus 10. That is, if the user desires the apparatus 10 to have more stability during use, the user may place the retaining strap 52 around the torso, attach the retaining strap holder 50 to the upright support 14 and the retaining strap 52, and secure the apparatus 10 more securely with the user's body. The retaining strap holder 50 has one or more proximal strap slots 53 which allow for threading and retention of the retaining strap 52 during use.

In operation, the user first adjusts the height of the breast supporters 38 for optimal positioning beneath each breast. This height adjustment is accomplished via a combination of movements of the attachment yoke 26 on said upright support 14 and/or movement of said substantially right angle member 36 first leg 40 within said yoke 26. The user then adjusts the width of said breast supporters 38 by moving each on said second leg 42 for optimum positioning relative to the user's breasts. The user then secures all setscrews, clamps, or fasteners in order to secure the exact position of the breast supporters 38. The user then positions the breast supporters 38 under each breast and places the base 12 upon a table, a structure, or upon the user's lap if the user is in a seated position. The breast weight is thereafter removed from the user's upper torso and back and placed upon the table or user's lap.

For the fifth through ninth alternative embodiments, the height and width adjustments are performed as described, the open portion of said "U" channel 18 is placed over, around, or with a table top, a chair arm, or other type of structure, and the channel setscrew 20 is tightened to secure the assembly 10 thereto. Again, the user positions the breast supporters 38 under each breast and removes breast weight from the user's upper torso and back. For the third and fourth alternative embodiment, the user performs the width adjustments as described and also places the apparatus 10 upon a table, a structure, or upon the user's lap. For the tenth alternative embodiment, the user places the user's belt through the belt channel 54 and reattaches the user's belt with the user's body with the arm 16 preferably near the frontmost center of the user's body. The upright support 14 is then adjusted as afore described.

For any embodiment, if the user desires a more secure operation of the apparatus, the user places the retaining strap 52 around the torso, attaches the retaining strap holder 50 to the upright support 14 and the retaining strap 52, and achieves a third point of support for the apparatus 10.

Although described for enablement purposes, the lengths, widths, and other dimensional attributes may depart significantly from those specified. The shape, size, location, component numbers and mounting methods utilized for each of the components or constituent elements may take a plurality of forms as recognized within the pertinent arts without departing from the scope and spirit of the present invention.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. An adjustable breast support apparatus comprising:
a base having a form capable of mounting or sitting with a table, a chair, or another structure; and
an upright support positioned to extend from said base and slightly cant toward a user whereby said upright support is capable of extending toward one or more breasts of the user; and
an attachment yoke adjustably positioned and securable upon said upright support; and
said attachment yoke having a center hole through which said upright support fits and moveably mates; and
said center hole having one or more yoke setscrews capable of securing said attachment yoke with said upright support; and
said attachment yoke having one or more mounts at which one or more breast supporter assemblies are slidable or movable and securable; and
said attachment yoke further having one or more breast supporter assembly holes into which said breast supporter assembly slidably or movably mounts and is securable; and
said breast supporter assembly having a substantially right angle member having a first leg which slidably mates with said attachment yoke and a second leg upon which a substantially "D" shaped breast supporter is moveably mounted; and
said breast supporter having a top surface with a form whereby said form is capable of gently and comfortably seating beneath and supporting the user's breast and a partially "U" shape or concave surface with a bottom of said "U" traversing from a proximal to a distal location and said breast supporter substantially conforming to the user's breast; and said breast supporter having a bottom surface having an extension; and said extension having a breast support hole through which said second leg is slidably positioned; and a breast support setscrew within said extension capable of securing said breast supporter with said second leg; and said breast supporter moveably mounted whereby said breast supporter may accommodate various distances or separations between the user's breasts; and said yoke and said breast supporter assembly in combination with said upright support capable of a height and a width adjustment for an optimum positioning of said breast supporter and further capable of securing said breast supporter in said optimum positioning; and a retaining strap holder having a distal partial arcuate retainer capable of fitting around said upright support and providing an additional retention point; and said retaining strap holder having one or more proximal strap slots capable of retaining a retaining strap whereby said upright support and breast supporter assembly may be retained more securely around the user and said retaining strap providing another point of support.

* * * * *